United States Patent
Thomas et al.

(10) Patent No.: US 12,498,445 B2
(45) Date of Patent: Dec. 16, 2025

(54) ULTRA-WIDEBAND MEASUREMENTS FOR RADIO ACCESS TECHNOLOGY-INDEPENDENT POSITIONING

(71) Applicant: Lenovo (Singapore) Pte. Ltd., New Tech Park (SG)

(72) Inventors: Robin Thomas, Bad Nauheim (DE); Karthikeyan Ganesan, Kronberg im Taunus (DE); Ali Ramadan Ali, Kraiburg am Inn (DE); Ankit Bhamri, Rödermark (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 258 days.

(21) Appl. No.: 18/258,498

(22) PCT Filed: Dec. 20, 2021

(86) PCT No.: PCT/IB2021/062048
§ 371 (c)(1),
(2) Date: Jun. 20, 2023

(87) PCT Pub. No.: WO2022/130361
PCT Pub. Date: Jun. 23, 2022

(65) Prior Publication Data
US 2024/0019525 A1 Jan. 18, 2024

Related U.S. Application Data

(60) Provisional application No. 63/127,761, filed on Dec. 18, 2020.

(51) Int. Cl.
*H04W 64/00* (2009.01)
*G01S 5/02* (2010.01)

(52) U.S. Cl.
CPC ........... *G01S 5/0236* (2013.01); *H04W 64/00* (2013.01)

(58) Field of Classification Search
CPC .................... H04W 64/00; G01S 5/0236
(Continued)

(56) References Cited

U.S. PATENT DOCUMENTS

2014/0301427 A1 10/2014 Khalaf-Allah
2017/0367766 A1* 12/2017 Mahfouz ............... A61F 2/3859
(Continued)

FOREIGN PATENT DOCUMENTS

| CN | 210075590 U | 2/2020 |
| CN | 111405656 A | 7/2020 |
| CN | 112068073 A | 12/2020 |

OTHER PUBLICATIONS

PCT/IB2021/062048, "Notification of Transmittal of the International Search Report and the Written Opinion of the International Searching Authority, or the Declaration", International Searching Authority, Apr. 4, 2022, pp. 1-11.
(Continued)

*Primary Examiner* — Joseph Arevalo
(74) *Attorney, Agent, or Firm* — Kunzler Bean & Adamson

(57) ABSTRACT

Apparatuses, methods, and systems are disclosed for ultra-wideband measurements for radio access technology-independent positioning. One apparatus includes a transceiver that transmits a set of capabilities related to ultra-wideband positioning, receives UWB assistance data to perform UWB positioning, and transmits a UWB measurement and location information report for the UE device using the at least one UWB positioning method associated with at least one of a set of timing-based and a set of angular-based UWB measurements. The apparatus includes a processor that
(Continued)

determines information for potential causes of error for one or more of a UWB configuration and a position estimate for the UE device. The transceiver transmits the determined information for the potential causes of error and receives UWB-specific error information associated with one or more of the UWB configuration and the position estimate information for correcting the determined potential causes of error.

20 Claims, 10 Drawing Sheets

(58) Field of Classification Search
USPC ...... 455/456.1, 456.3, 418, 147, 307, 404.1, 455/522
See application file for complete search history.

(56) References Cited

U.S. PATENT DOCUMENTS

2023/0296753 A1* 9/2023 Khlat ................... G01S 13/765
342/125
2024/0005296 A1* 1/2024 Stankoulov ........ G06Q 20/3224

OTHER PUBLICATIONS

ATIS, "Recommendations for Establishing Wide Scale Indoor Location Performance", ATIS 0500027, May 2015, pp. 1-3.
Chiani et al, "Coexistence Between UWB and Narrow-Band Wireless Communication Systems", IEEE, Mar. 2009, pp. 1-25.
IEEE, "802.11-2020—IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications", 10.1109/IEEESTD.2021.9363693, Feb. 26, 2021, pp. 1-4.
IEEE, "Impact of FR1 5G NR Jammers on UWB Indoor Position Location Systems", 10.1109/IPIN.2019.8911753, Nov. 28, 2019, pp. 1-4.
IEEE, "An Overview of the IEEE 802.15.4z Standard its Comparison and to the Existing UWB Standards", 10.1109/RADIOELEK.2019.8733537, Jun. 10, 2019, pp. 1-4.
IEEE, "An Overview of IEEE 802.15.6 standard", 10,1109/ISABEL.2010.5702867, Jan. 28, 2011, pp. 1-4.
Meissner et al., "Accurate and Robust Indoor Localization Systems using Ultra-wideband Signals", arXiv:1304.7928v1 [cs.ET], Apr. 30, 2013, pp. 1-9.
Huawei et al., "Add clarifications to the living CR", 3GPP TSG-SA WG3 Meeting #98bis-e draft_S3-200720-r2, Apr. 14-17, 2020, pp. 1-4.
Taha et al., "UWB Coexistence with 3G and 4G Cellular Systems", Ultra Wideband, Oct. 3, 2012, pp. 1-32.
3GPP, "3rd Generation Partnership Project; Technical Specification Group Services and System Aspects; Service requirements for cyber-physical control applications in vertical domains; Stage 1 (Release 17)", 3GPP TS 22.104 V17.4.0, Sep. 2020, pp. 1-76.
3GPP, "3rd Generation Partnership Project; Technical Specification Group Services and System Aspects; Service requirements for the 5G system; Stage 1 (Release 18)", 3GPP TS 22.261 V18.0.0, Sep. 2020, pp. 1-84.
3GPP, "3rd Generation Partnership Project; Technical Specification Group Services and System Aspects; Universal Geographical Area Description (GAD) (Release 16)", 3GPP TS 23.032 V16.0.0, Jul. 2020, pp. 1-32.
3GPP, "3rd Generation Partnership Project; Technical Specification Group Services and System Aspects; Functional stage 2 description of Location Services (LCS) (Release 16)", 3GPP TS 23.271 V16.0.0, Jul. 2020, pp. 1-188.
3GPP, "3rd Generation Partnership Project; Technical Specification Group Services and System Aspects; 5G System (5GS) Location Services (LCS); Stage 2 (Release 16)", 3GPP TS 23.273 V16.4.0, Jul. 2020, pp. 1-96.
3GPP, "3rd Generation Partnership Project; Technical Specification Group Services and System Aspects; System architecture for the 5G System (5GS); Stage 2 (Release 16)", 3GPP TS 23.501 V16.6.0, Sep. 2020, pp. 1-447.
3GPP, "3rd Generation Partnership Project; Technical Specification Group Services and System Aspects; Procedures for the 5G System (5GS); Stage 2 (Release 16)", 3GPP TS 23.502 V16.6.0, Sep. 2020, pp. 1-597.
3GPP, "3rd Generation Partnership Project; Technical Specification Group Radio Access Network; Evolved Universal Terrestrial Radio Access (E-UTRA); Physical channels and modulation (Release 16)", 3GPP TS 36.211 V16.3.0, Sep. 2020, pp. 1-249.
3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.2.0, Sep. 2020, pp. 1-117.

* cited by examiner

ULTRA-WIDEBAND MEASUREMENTS FOR RADIO ACCESS TECHNOLOGY-INDEPENDENT POSITIONING

CROSS-REFERENCE TO RELATED APPLICATIONS

This application claims the benefit of U.S. Provisional Patent Application No. 63/127,761, entitled "UWB MEASUREMENTS FOR RAT-INDEPENDENT POSITIONING" and filed on Dec. 18, 2020, for Robin Thomas et al, which is incorporated herein by reference.

FIELD

The subject matter disclosed herein relates generally to wireless communications and more particularly relates to ultra-wideband measurements for radio access technology-independent positioning.

BACKGROUND

In certain wireless communication systems, 5G Location Services ("LCS") are inherently part of the 3GPP Architecture and radio access network ("RAN") framework to enable the identification and standardized reporting of a UE's or a group of UEs location information based on the supported RAT-dependent and RAT-independent measurements. The current issue within the 3GPP framework is the lack of support for enabling high accuracy positioning and/or ranging using ultra-wideband ("UWB") signal measurements at the network-side (e.g., UE-assisted) and/or UE-side (e.g., UE-based) positioning.

BRIEF SUMMARY

Disclosed are procedures for ultra-wideband measurements for radio access technology-independent positioning. The procedures may be implemented by apparatus, systems, methods, or computer program products.

In one embodiment, a first apparatus includes a transceiver that transmits, to a location server of a mobile wireless communication network, a set of capabilities related to ultra-wideband ("UWB") positioning for the UE device in response to a request from the location server for the set of capabilities, the set of capabilities used to determine at least one UWB positioning method for performing UWB positioning of the UE device. In one embodiment, the transceiver receives, from the location server, UWB assistance data to perform UWB positioning in response to a request for the assistance information, the assistance information comprising the at least one UWB positioning method for performing UWB positioning. In one embodiment, the transceiver transmits, to the location server, a UWB measurement and location information report for the UE device using the at least one UWB positioning method associated with at least one of a set of timing-based and a set of angular-based UWB measurements in response to a request from the location server for the UWB measurement and location information. In one embodiment, the first apparatus includes a processor that determines information for potential causes of error for one or more of a UWB configuration and a position estimate for the UE device. In one embodiment, the transceiver transmits, to the location server, the determined information for the potential causes of error. In one embodiment, the transceiver receives, from the location server, MB-specific error information associated with one or more of the UWB configuration and the position estimate information for correcting the determined potential causes of error.

In one embodiment, a first method includes transmitting, to a location server of a mobile wireless communication network, a set of capabilities related to ultra-wideband ("UWB") positioning for the UE device in response to a request from the location server for the set of capabilities, the set of capabilities used to determine at least one MB positioning method for performing UWB positioning of the UE device. In one embodiment, the first method includes receiving, from the location server, UWB assistance data to perform UWB positioning in response to a request for the assistance information, the assistance information comprising the at least one UWB positioning method for performing UWB positioning. In one embodiment, the first method includes transmitting, to the location server, a UWB measurement and location information report for the UE device using the at least one UWB positioning method associated with at least one of a set of timing-based and a set of angular-based UWB measurements in response to a request from the location server for the UWB measurement and location information. In one embodiment, the first method includes determining information for potential causes of error for one or more of a UWB configuration and a position estimate for the UE device. In one embodiment, the transceiver transmits, to the location server, the determined information for the potential causes of error. In one embodiment, the first method includes receiving, from the location server, MB-specific error information associated with one or more of the UWB configuration and the position estimate information for correcting the determined potential causes of error.

In one embodiment, a second apparatus includes a transceiver that receives, from a user equipment ("UE") device, a set of capabilities related to ultra-wideband ("MB") positioning for the UE device in response to a request for the set of capabilities, the set of capabilities used to determine at least one UWB positioning method for performing UWB positioning of the UE device. In one embodiment, the transceiver transmits, to the user equipment ("UE") device, MB assistance data to perform UWB positioning in response to a request for the assistance information, the assistance information comprising the at least one UWB positioning method for performing UWB positioning. In one embodiment, the transceiver receives, from the UE device, a UWB measurement and location information report for the UE device using the at least one UWB positioning method associated with at least one of a set of timing-based and a set of angular-based UWB measurements in response to a request from the location server for the UWB measurement and location information. In one embodiment, the transceiver receives, from the UE device, information describing potential causes of error for one or more of a UWB configuration and a position estimate for the UE device. In one embodiment, the transceiver transmits, to the UE device, UWB-specific error information associated with one or more of the UWB configuration and the position estimate information for correcting the determined potential causes of error.

In one embodiment, a second method includes receiving, from a user equipment ("UE") device, a set of capabilities related to ultra-wideband ("UWB") positioning for the UE device in response to a request for the set of capabilities, the set of capabilities used to determine at least one UWB positioning method for performing UWB positioning of the UE device. In one embodiment, the second method includes transmitting, to the user equipment ("UE") device, UWB assistance data to perform UWB positioning in response to a request for the assistance information, the assistance information comprising the at least one UWB positioning method for performing UWB positioning. In one embodiment, the second method includes receiving, from the UE device, a UWB measurement and location information report for the UE device using the at least one UWB positioning method associated with at least one of a set of timing-based and a set of angular-based UWB measurements in response to a request from the location server for the UWB measurement and location information. In one embodiment, the second method includes receiving, from the UE device, information describing potential causes of error for one or more of a UWB configuration and a position estimate for the UE device. In one embodiment, the second method includes transmitting, to the UE device, UWB-specific error information associated with one or more of the UWB configuration and the position estimate information for correcting the determined potential causes of error.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
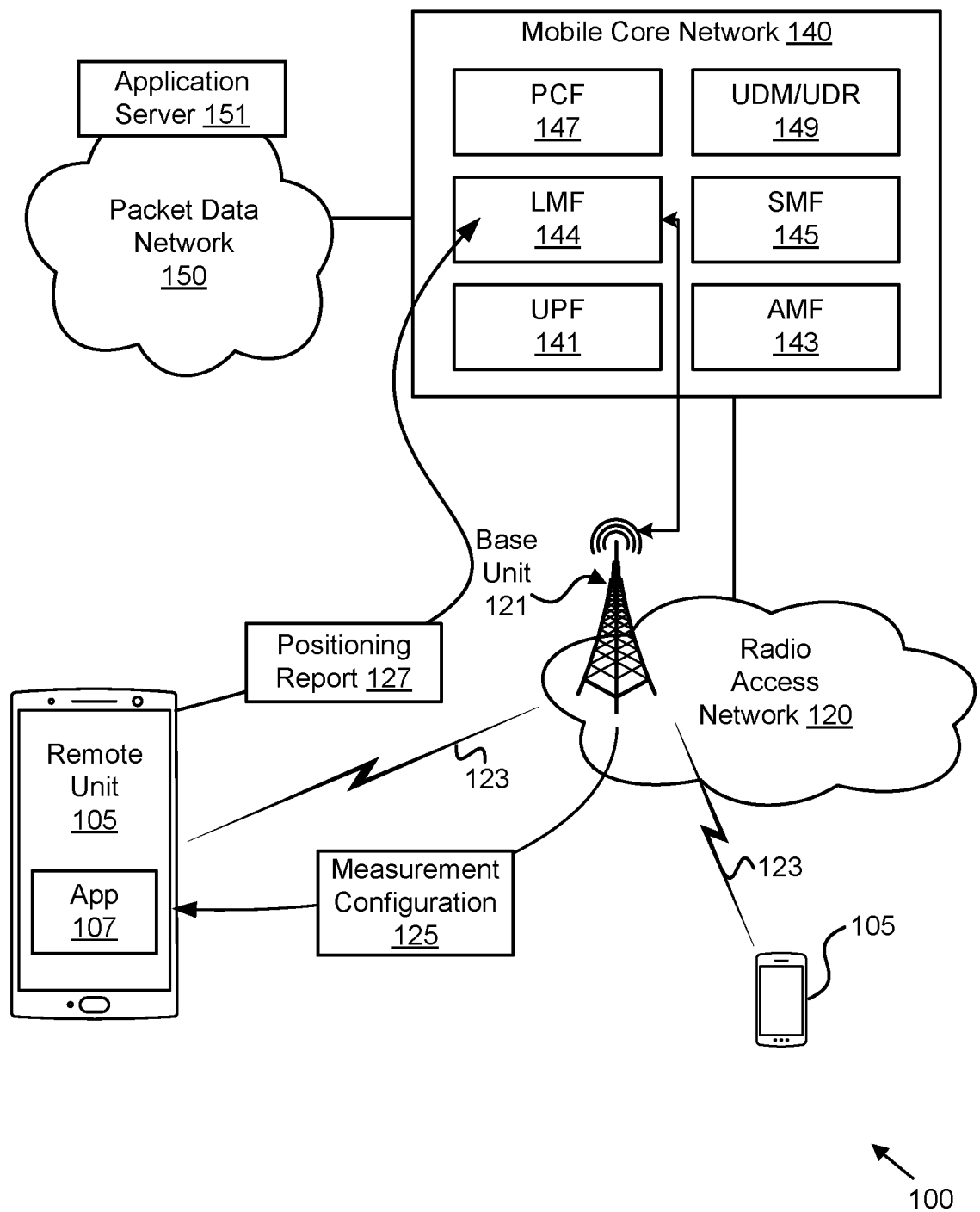
FIG. 1 is a schematic block diagram illustrating one embodiment of a wireless communication system for ultra-wideband measurements for radio access technology-independent positioning.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for ultra-wideband measurements for radio access technology-independent positioning. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

5G LCS are inherently part of the 3GPP Architecture and RAN framework to enable the identification and standardized reporting of a UE's or a group of UEs location information based on the supported RAT-dependent and RAT-independent measurements. The current issue within the 3GPP framework is the lack of support for enabling high accuracy positioning and/or ranging using UWB signal measurements at the network-side (e.g., UE-assisted) and/or UE-side (e.g., UE-based) positioning.

UWB has been extensively studied and implemented in commercial products for several years, and it has always been regarded as a well-established wireless technology for high accuracy positioning and tracking for indoor/short range scenarios. UWB has the potential to impact several vertical use cases such as public safety, commercial, automotive, and IIoT scenarios. UWB technology has also been standardized in 802.15.4z (HRP-UWB and LRP-UWB) and IEEE 802.15.6 (wireless body area networks).

The current 3GPP (new radio ("NR") and long-term evolution ("LTE")) design lacks the necessary support for enabling and exploiting RAT-independent UWB-based measurements for enhanced 3GPP UE-assisted, UE-based, or SL-based positioning. This provides an additional degree of freedom for hybrid positioning methods involving RAT-independent and RAT-dependent positioning techniques. The present disclosure aims to address this key open issue by providing the necessary signaling support for the location management function ("LMF"), gNB, and UE nodes for performing the required UWB positioning procedures and location estimation along the Uu and SL (e.g., PC5) interface.

In this disclosure, solutions are presented for supporting UWB measurements to complement the RAT-independent positioning framework. The solution proposes the supported UWB positioning methods, UE positioning modes, and types of UWB measurements to be exchanged between the target-UE and the location server, e.g., LMF. This use of UWB RAT-independent positioning provides an additional degree of freedom for the use of hybrid positioning technologies within the 3GPP positioning framework. UWB RAT-independent positioning can also be flexibly performed along with other SL positioning methods.

FIG. 1 depicts a wireless communication system 100 for ultra-wideband measurements for radio access technology-independent positioning, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140. As described in greater detail below, the base unit(s) 121 may provide a cell operating using a first frequency range and/or a cell operating using a second frequency range.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, e.g., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (e.g., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Location Management Function ("LMF") 144, a Unified Data Management function ("UDM"") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (e.g., session establishment, modification, release), remote unit (e.g., UE) IP address allocation & management, DL data notification, and traffic steering configuration of the UPF 141 for proper traffic routing.

The LMF 144 receives positioning measurements or estimates from RAN 120 and the remote unit 105 (e.g., via the AMF 143) and computes the position of the remote unit 105. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Policy Control Function ("PCF") (which provides policy rules to CP functions), a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

As discussed in greater detail below, the remote unit 105 receives a positioning measurement configuration 125 from the network (e.g., from the LMF 144 via RAN 120), including a positioning processing timeline for the remote unit 105 based on the remote unit's capabilities. The remote unit 105 performs positioning measurements, as described in greater detail below, and sends a positioning report 127 to the LMF 144.

While FIG. 1 depicts components of a 5G RAN and a 5G core network, the described embodiments for ultra-wide-band measurements for radio access technology-independent positioning apply to other types of communication networks and RATs, including IEEE 802.11 variants, Global System for Mobile Communications ("GSM", e.g., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station but it is replaceable by any other radio access node, e.g., gNB, ng-eNB, eNB, Base Station ("BS"), Access Point ("AP"), etc. Further, the operations are described mainly in the context of 5G NR. However, the proposed solutions/methods are also equally applicable to other mobile communication systems supporting ultra-wide-band measurements for radio access technology-independent positioning.

Figure 2:
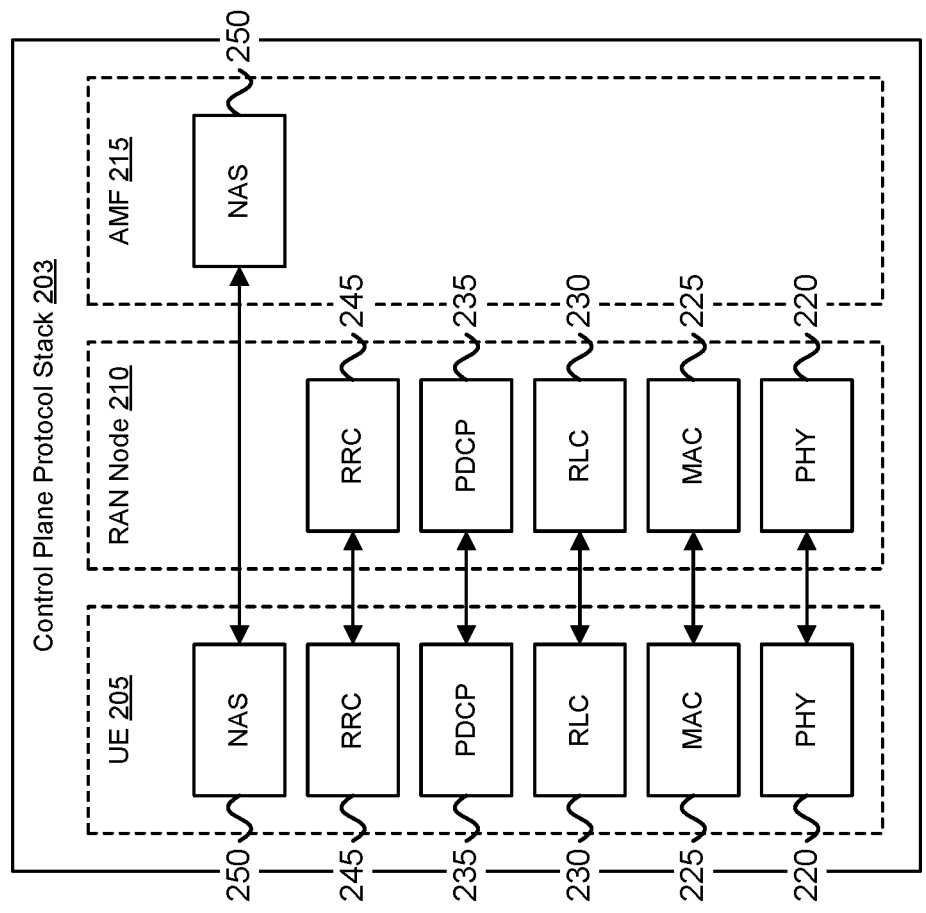
FIG. 2 is a block diagram illustrating one embodiment of a 5G New Radio ("NR") protocol stack.
Figure 2:
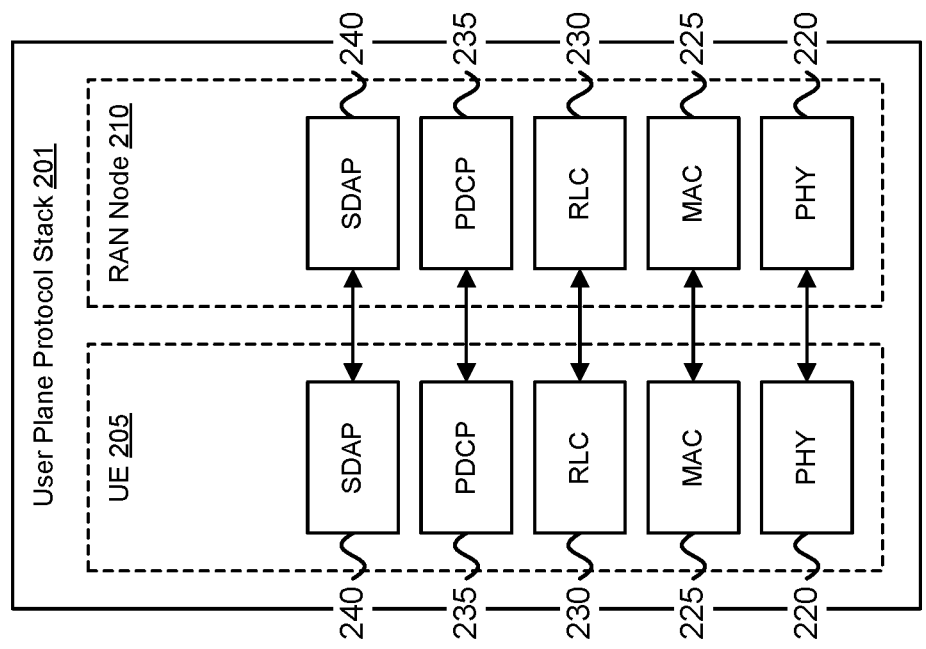

FIG. 2 depicts a NR protocol stack 200, according to embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform a Clear Channel Assessment and/or Listen-Before-Talk ("CCA/LBT") procedure using energy detection thresholds, as described herein. In certain embodiments, the physical layer 220 may send a notification of UL Listen-Before-Talk ("LBT") failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (e.g., RAN node 210) and carries information over the wireless portion of the network.

As background, for Release 17 ("Rel-17") of the 3GPP specification, the different positioning requirements are especially stringent with respect to accuracy, latency, and reliability. Table 1 shows positioning performance requirements for different scenarios in an Industrial IoT ("IIoT") or indoor factory setting.

TABLE 1

IIoT Positioning Performance Requirements

| Scenario | Horizontal accuracy | Vertical accuracy | Availability | Latency for position estimation of UE | UE Speed | Corresponding Positioning Service Level |
|---|---|---|---|---|---|---|
| Mobile control panels with safety functions (non-danger zones) | <5 m | <3 m | 90% | <5 s | N/A | Service Level 2 |
| Process automation - plant asset management | <1 m | <3 m | 90% | <2 s | <30 km/h | Service Level 3 |
| Flexible, modular assembly area in smart factories (for tracking of tools at the work-place location) | <1 m (relative positioning) | N/A | 99% | 1 s | <30 km/h | Service Level 3 |
| Augmented reality in smart factories | <1 m | <3 m | 99% | <15 ms | <10 km/h | Service Level 4 |
| Mobile control panels with safety functions in smart factories (within factory danger zones) | <1 m | <3 m | 99.9% | <1 s | N/A | Service Level 4 |
| Flexible, modular assembly area in smart factories (for autonomous vehicles, only for monitoring proposes) | <50 cm | <3 m | 99% | 1 s | <30 km/h | Service Level 5 |
| Inbound logistics for manufacturing (for driving trajectories (if supported by further sensors like camera, GNSS, IMU) of indoor autonomous driving systems)) | <30 cm (if supported by further sensors like camera, GNSS, IMU) | <3 m | 99.9% | 10 ms | <30 km/h | Service Level 6 |
| Inbound logistics for manufacturing (for storage of goods) | <20 cm | <20 cm | 99% | <1 s | <30 km/h | Service Level 7 |

Some UE positioning method supported in Rel-16 are listed in Table 2. The separate positioning techniques as indicated in Table 2 may be currently configured and performed based on the requirements of the LMF and/or UE capabilities. Note that Table 2 includes TBS positioning based on PRS signals, but only OTDOA based on LTE signals is supported. The E-CID includes Cell-ID for NR method. The Terrestrial Beacon System ("TBS") method refers to TBS positioning based on Metropolitan Beacon System ("MBS") signals.

TABLE 2

Supported Rel-16 UE positioning methods

| Method | UE-based | UE-assisted, LMF-based | NG-RAN node assisted | Secure User Plane Location ("SUPL") |
|---|---|---|---|---|
| A-GNSS | Yes | Yes | No | Yes (UE-based and UE-assisted) |
| OTDOA | No | Yes | No | Yes (UE-assisted) |
| E-CID | No | Yes | Yes | Yes for E-UTRA (UE-assisted) |
| Sensor | Yes | Yes | No | No |
| WLAN | Yes | Yes | No | Yes |
| Bluetooth | No | Yes | No | No |
| TBS | Yes | Yes | No | Yes (MBS) |
| DL-TDOA | Yes | Yes | No | No |
| DL-AoD | Yes | Yes | No | No |
| Multi-RTT | No | Yes | Yes | No |
| NR E-CID | No | Yes | FFS | No |
| UL-TDOA | No | No | Yes | No |
| UL-AoA | No | No | Yes | No |

Figure 3:
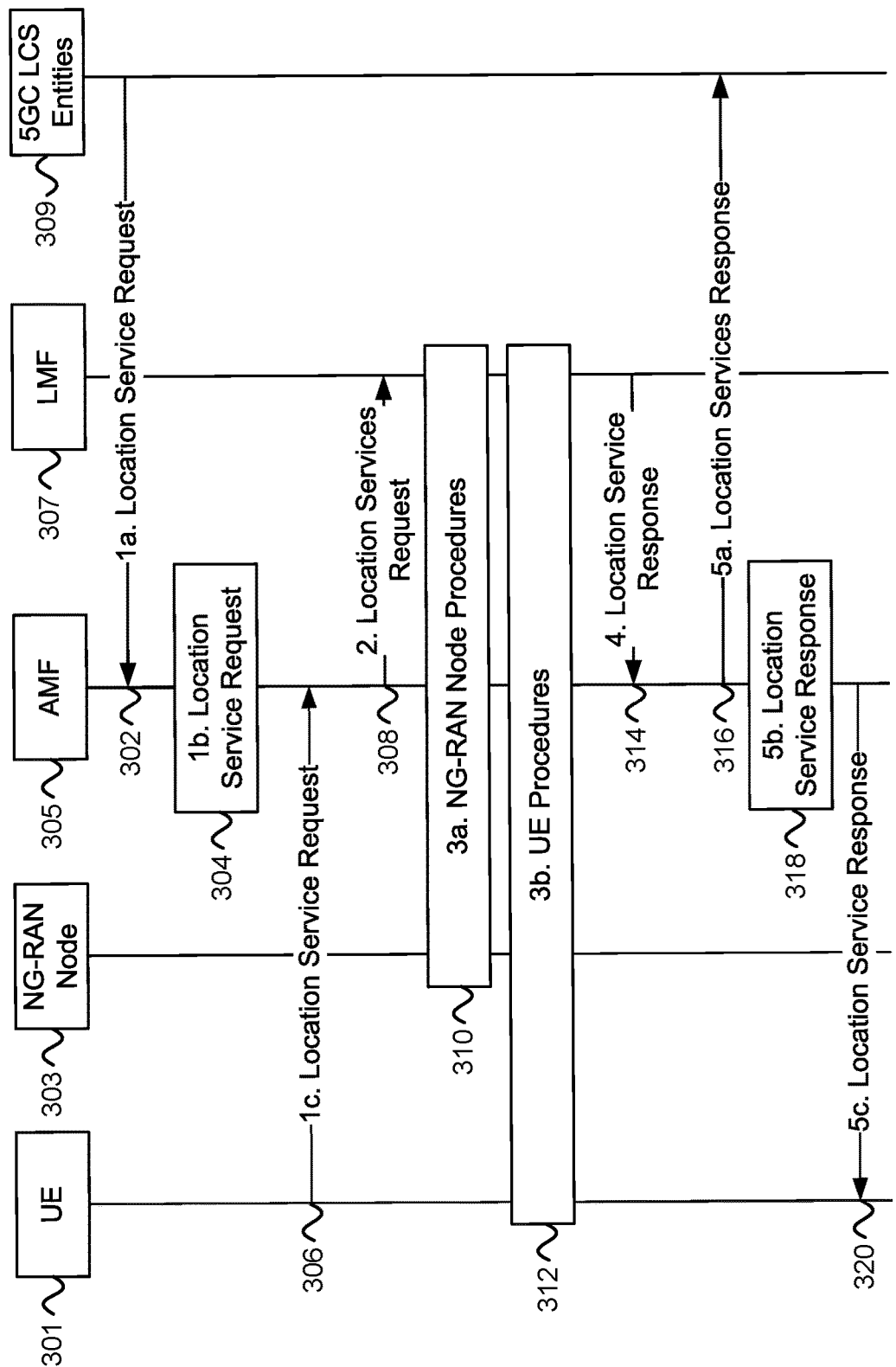
FIG. 3 is a diagram illustrating one embodiment of a call flow for Location Service Support by NG-RAN.

Regarding the LCS architecture, to support positioning of a target UE and delivery of location assistance data to a UE with NG-RAN access in 5GS, location related functions are distributed as shown in the architecture in TS 23.271 and as clarified in greater detail in TS 23.501 and TS 23.273. The overall sequence of events applicable to the UE, NG-RAN and LMF for any location service is shown in FIG. 3.

Note that when the AMF 305 receives a Location Service Request in case of the UE 301 is in CM-IDLE state, the AMF 305 performs a network triggered service request as defined in TS 23.502 and TS 23.273 in order to establish a signaling connection with the UE 301 and assign a specific serving gNB or ng-eNB. The UE 301 is assumed to be in connected mode before the beginning of the flow shown in the FIG. 3; that is, any signaling that might be required to bring the UE 301 to connected mode prior to step 1a is not shown. The signaling connection may, however, be later released (e.g., by the NG-RAN 303 node as a result of signaling and data inactivity) while positioning is still ongoing.

In step 1a, in one embodiment, some entity in the 5GC 309 (e.g., GMLC) requests (see messaging 302) some location service (e.g., positioning) for a target UE 301 to the serving AMF 305. In step 1b, in one embodiment, the serving AMF 305 for a target UE 301 determines (see block 304) the need for some location service (e.g., to locate the UE 301 for an emergency call). In step 1c, in one embodiment, the UE 301 requests (see messaging 306) some location service (e.g., positioning or delivery of assistance data) to the serving AMF 305 at the NAS level.

At step 2, in one embodiment, the AMF 305 transfers (see messaging 308) the location service request to an LMF 307.

In step 3a, in one embodiment, the LMF 307 instigates location procedures (see block 310) with the serving and possibly neighboring ng-eNB or gNB in the NG-RAN 303, e.g., to obtain positioning measurements or assistance data.

At step 3b, in one embodiment, in addition to step 3a or instead of step 3a, the LMF 307 instigates location procedures (see block 312) with the UE 301, e.g., to obtain a location estimate or positioning measurements or to transfer location assistance data to the UE 301.

At step 4, in one embodiment, the LMF 307 provides (see messaging 314) a location service response to the AMF 305 and includes any needed results, e.g., success or failure indication and, if requested and obtained, a location estimate for the UE.

At step 5a, in one embodiment, if step 1a was performed, the AMF 305 returns a location service response (see messaging 316) to the 5GC entity 309 in step 1a and includes any needed results, e.g., a location estimate for the UE 301.

At step 5b, in one embodiment, if step 1b occurred, the AMF 305 uses the location service response (see block 318) received in step 4 to assist the service that triggered this in step 1b (e.g., may provide a location estimate associated with an emergency call to a GMLC).

At step 5c, in one embodiment, if step 1c was performed, the AMF 305 returns (see messaging 320) a location service response to the UE 301 and includes any needed results, e.g., a location estimate for the UE 301.

Location procedures applicable to NG-RAN occur in steps 3a and 3b in FIG. 3 and are defined in greater detail in this specification. Other steps in FIG. 3 are applicable only to the 5GC and are described in greater detail and in TS 23.502 and TS 23.273.

Steps 3a and 3b can involve the use of different position methods to obtain location related measurements for a target UE and from these compute a location estimate and possibly additional information like velocity. The case that the NG-RAN node functions as an LCS client is not supported in this version of the specification.

In one embodiment, the following RAT-dependent positioning techniques may be supported by the system 100:

DL-TDoA: The DL TDOA positioning method makes use of the DL RS Time Difference ("RSTD") (and optionally DL PRS RS Received Power ("RSRP") of DL PRS RS Received Quality ("RSRQ")) of downlink signals received from multiple TPs, at the UE (e.g., remote unit 105). The UE measures the DL RSTD (and optionally DL PRS RSRP) of the received signals using assistance data received from the positioning server, and the resulting measurements are used along with other configuration information to locate the UE in relation to the neighboring Transmission Points ("TPs").

DL-AoD: The DL Angle of Departure ("AoD") positioning method makes use of the measured DL PRS RSRP of downlink signals received from multiple TPs, at the UE. The UE measures the DL PRS RSRP of the received signals using assistance data received from the positioning server, and the resulting measurements are used along with other configuration information to locate the UE in relation to the neighboring TPs.

Multi-RTT: The Multiple-Round Trip Time ("Multi-RTT") positioning method makes use of the UE Receive-Transmit ("Rx-Tx") measurements and DL PRS RSRP of downlink signals received from multiple TRPs, measured by the UE and the gNB Rx-Tx measurements (e.g., measured by RAN node) and UL SRS-RSRP at multiple TRPs of uplink signals transmitted from UE.

The UE measures the UE Rx-Tx measurements (and optionally DL PRS RSRP of the received signals) using assistance data received from the positioning server, and the TRPs measure the gNB Rx-Tx measurements (and optionally UL SRS-RSRP of the received signals) using assistance data received from the positioning server. The measurements are used to determine the Round Trip Time ("RTT") at the positioning server which are used to estimate the location of the UE.

E-CID/NR E-CID: Enhanced Cell ID (CID) positioning method, the position of a UE is estimated with the knowledge of its serving ng-eNB, gNB and cell and is based on LTE signals. The information about the serving ng-eNB, gNB and cell may be obtained by paging, registration, or other methods. NR Enhanced Cell ID (NR E CID) positioning refers to techniques which use additional UE measurements and/or NR radio resource and other measurements to improve the UE location estimate using NR signals.

Although NR E-CID positioning may utilize some of the same measurements as the measurement control system in the RRC protocol, the UE generally is not expected to make additional measurements for the sole purpose of positioning; e.g., the positioning procedures do not supply a measurement configuration or measurement control message, and the UE reports the measurements that it has available rather than being required to take additional measurement actions.

UL-TDoA: The UL TDOA positioning method makes use of the UL TDOA (and optionally UL SRS-RSRP) at multiple RPs of uplink signals transmitted from the UE. The RPs measure the UL TDOA (and optionally UL SRS-RSRP) of the received signals using assistance data received from the positioning server, and the resulting measurements are used along with other configuration information to estimate the location of the UE.

UL-AoA: The UL Angle of Arrival ("AoA") positioning method makes use of the measured azimuth and the zenith angles of arrival at multiple RPs of uplink signals transmitted from the UE. The RPs measure A-AoA and Z-AoA of the received signals using assistance data received from the positioning server, and the resulting measurements are used along with other configuration information to estimate the location of the UE.

Figure 4:
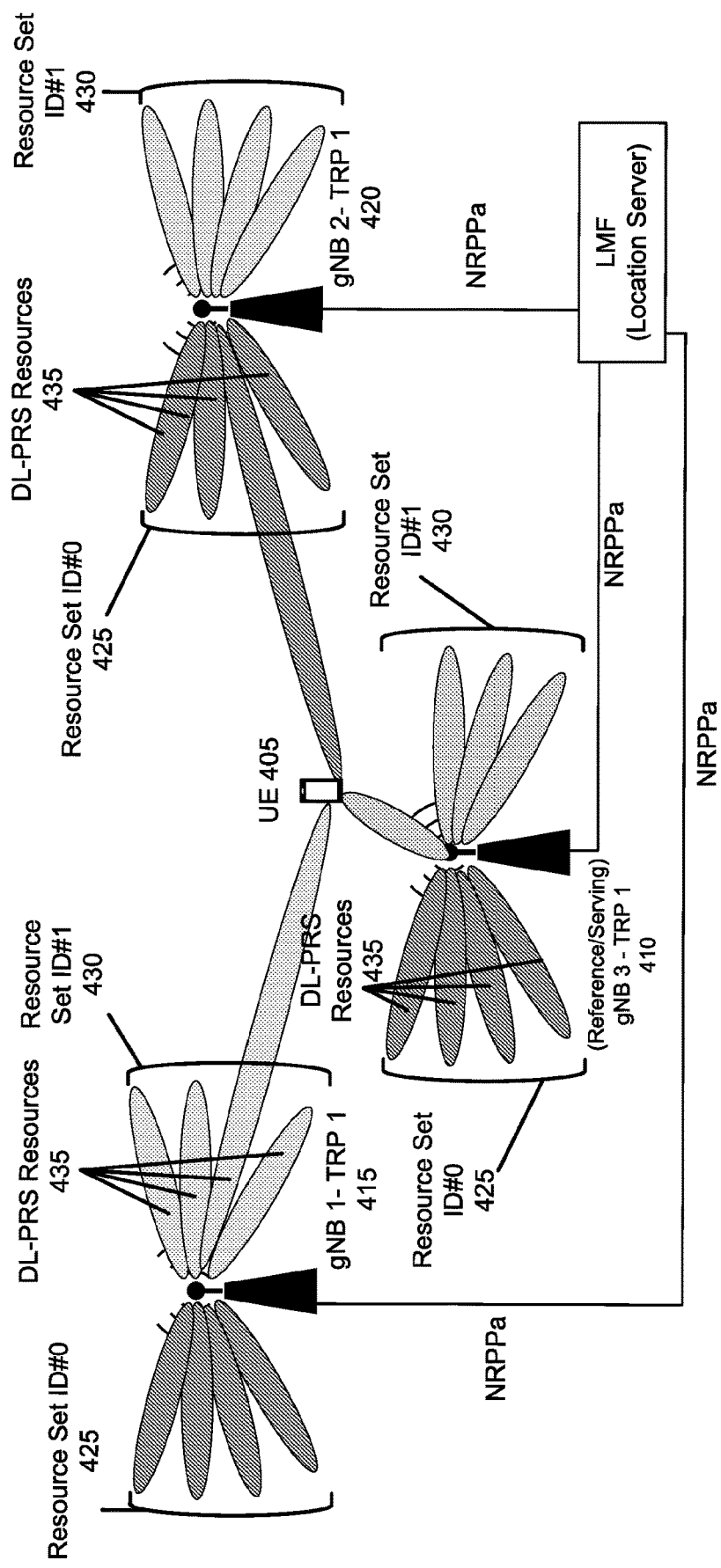
FIG. 4 is a diagram illustrating one embodiment of NR Beam-based Positioning.

FIG. 4 depicts a system 400 for NR beam-based positioning. According to Rel-16, the PRS can be transmitted by different base stations (serving and neighboring) using narrow beams over Frequency Range #1 Between ("FR1", e.g., frequencies from 410 MHz to 7125 MHz) and Frequency Range #2 ("FR2", e.g., frequencies from 24.25 GHz to 52.6 GHz), which is relatively different when compared to LTE where the PRS was transmitted across the whole cell.

As illustrated in FIG. 4, a UE 405 may receive PRS from a first gNB ("gNB 3") 410, which is a serving gNB, and also from a neighboring second gNB ("gNB 1") 415, and a neighboring third gNB ("gNB 2") 420. Here, the PRS can be locally associated with a set of PRS Resources grouped under a Resource Set ID for a base station (e.g., TRP). In the depicted embodiments, each gNB 410, 415, 420 is configured with a first Resource Set ID 425 and a second Resource Set ID 430. As depicted, the UE 405 receives PRS on transmission beams; here, receiving PRS from the gNB 3 410 on a set of PRS Resources 435 from the second Resource Set ID 430, receiving PRS from the gNB 1 415 on a set of PRS Resources 435 from the second Resource Set ID 430, and receiving PRS from the gNB 2 420 on a set of PRS Resources 435 from the first Resource Set ID 425.

Similarly, UE positioning measurements such as Reference Signal Time Difference ("RSTD") and PRS RSRP measurements are made between beams as opposed to different cells as was the case in LTE. In addition, there are additional UL positioning methods for the network to exploit to compute the target UE's location. Table 3 lists the RS-to-measurements mapping required for each of the supported RAT-dependent positioning techniques at the UE, and Table 4 lists the RS-to-measurements mapping required for each of the supported RAT-dependent positioning techniques at the gNB.

TABLE 3

UE Measurements to enable RAT-dependent positioning techniques

| DL/UL Reference Signals | UE Measurements | To facilitate support of the following positioning techniques |
| --- | --- | --- |
| Rel-16 DL PRS | DL RSTD | DL-TDOA |
| Rel-16 DL PRS | DL PRS RSRP | DL-TDOA, DL-AoD, Multi-RTT |
| Rel-16 DL PRS/Rel-16 SRS for positioning | UE Rx-Tx time difference | Multi-RTT |
| Rel. 15 SSB/CSI-RS for RRM | SS-RSRP(RSRP for RRM), SS-RSRQ(for RRM), CSI-RSRP (for RRM), CSI-RSRQ (for RRM), SS-RSRPB (for RRM) | E-CID |

TABLE 4 gNB Measurements to enable RAT-dependent positioning techniques

| DL/UL Reference Signals | gNB Measurements | To facilitate support of the following positioning techniques |
| --- | --- | --- |
| Rel-16 SRS for positioning | UL RTOA | UL-TDOA |
| Rel-16 SRS for positioning | UL SRS-RSRP | UL-TDOA, UL-AoA, Multi-RTT |
| Rel-16 SRS for positioning, Rel-16 DL PRS | gNB Rx-Tx time difference | Multi-RTT |
| Rel-16 SRS for positioning, | A-AoA and Z-AoA | UL-AoA, Multi-RTT |

RAT-dependent positioning techniques involve the 3GPP RAT and core network entities to perform the position estimation of the UE, which are differentiated from RAT-independent positioning techniques which rely on Global Navigation Satellite System ("GNSS"), Inertial Measurement Unit ("IMU") sensor, WLAN and Bluetooth technologies for performing target device (e.g., UE) positioning.

Various RAT-Independent positioning techniques may be used. For instance, in network-assisted GNSS methods, these methods make use of UEs that are equipped with radio receivers capable of receiving GNSS signals. In 3GPP specifications the term GNSS encompasses both global and regional/augmentation navigation satellite systems.

Examples of global navigation satellite systems include GPS, Modernized GPS, Galileo, GLONASS, and BeiDou Navigation Satellite System ("BDS"). Regional navigation satellite systems include Quasi Zenith Satellite System ("QZSS") while the many augmentation systems, are classified under the generic term of Space Based Augmentation Systems ("SBAS") and provide regional augmentation services. In this concept, different GNSSs (e.g., GPS, Galileo, or the like) can be used separately or in combination to determine the location of a UE.

In barometric pressure sensor positioning, the barometric pressure sensor method makes use of barometric sensors to determine the vertical component of the position of the UE. The UE measures barometric pressure, optionally aided by assistance data, to calculate the vertical component of its location or to send measurements to the positioning server for position calculation. This method should be combined with other positioning methods to determine the 3D position of the UE.

The WLAN positioning method makes use of the WLAN measurements (AP identifiers and optionally other measurements) and databases to determine the location of the UE. The UE measures received signals from WLAN access points, optionally aided by assistance data, to send measurements to the positioning server for position calculation. Using the measurement results and a references database, the location of the UE is calculated. Alternatively, the UE makes use of WLAN measurements and optionally WLAN AP assistance data provided by the positioning server, to determine its location.

The Bluetooth positioning method makes use of Bluetooth measurements (beacon identifiers and optionally other measurements) to determine the location of the UE. The UE measures received signals from Bluetooth beacons. Using the measurement results and a references database, the location of the UE is calculated. The Bluetooth methods may be combined with other positioning methods (e.g., WLAN) to improve positioning accuracy of the UE.

A Terrestrial Beacon System ("TBS"), used for positioning, consists of a network of ground-based transmitters, broadcasting signals only for positioning purposes. The current type of TBS positioning signals are the Metropolitan Beacon System ("MBS") signals and Positioning Reference Signals ("PRS") (see TS 36.211). The UE measures received TBS signals, optionally aided by assistance data, to calculate its location or to send measurements to the positioning server for position calculation.

The motion sensor method makes use of different sensors such as accelerometers, gyros, magnetometers, to calculate the displacement of UE. The UE estimates a relative displacement based upon a reference position and/or reference time. UE sends a report comprising the determined relative displacement which can be used to determine the absolute position. This method should be used with other positioning methods for hybrid positioning.

In one embodiment, the high-level solution of the subject matter disclosed herein provides a detailed conceptual solution for the measurement assistance configuration, positioning procedures and report signaling for performing RAT-independent positioning using the UWB capability of a UE and/or group of UEs. The following overview of embodiments including corresponding advantages are described:

Embodiment 1: Details the supported positioning modes and measurements required to be reported for performing UWB ranging/positioning including timing-based and angular-based positioning methods.

Embodiment 2: Defines the information that may need to be transferred between various network entities including UE, NG-RAN and gNB to enable UWB positioning as part of the 3GPP framework. These may include the type of ranging measurements required for relative position estimation.

Embodiment 3: Describes the NR positioning procedures required for enabling UWB positioning including the necessary triggers, configuration and report signalling between UE and LMF.

In one embodiment, the benefits of the solutions herein include the addition of a high-accuracy RAT-independent positioning technology such as UWB within the 3GPP framework. This enables a further degree of freedom with respect to the available positioning technology choices for a UE of perform Hybrid positioning, e.g., using a combination of RAT-dependent and RAT-independent positioning techniques. In addition, the specification of exploiting UWB measurements for high-accuracy positioning can increase the existing accuracy for computing the location estimate using 3GPP entities (e.g., UE or LMF), especially in short range indoor environments.

The present embodiments describe the details to include UWB-based positioning in the current 3GPP positioning framework as well as corresponding enhancements. In addition, Embodiments 1-3 can be implemented in combination with each other to achieve an improved location accuracy estimate using UWB positioning techniques using the Uu and PC5 interface.

In the first embodiment, directed to supported NR Positioning modes based on UWB measurements and location information, the target-UE may also be supported and signaled with the following positioning modes in relation to UWB RAT-independent positioning/ranging using network assistance (Uu interface) and/or sidelink assistance (PC5 interface):

Standalone:
  a. The UE performs UWB position measurements and location computation, without network assistance.

UE-Assisted:
  a. The UE provides UWB position measurements with or without assistance from the network to the LMF for computation of a location estimate by the network.

UE-Based:
  a. The UE performs UWB position measurements and computation of a location estimate with network assistance.

SL-Based:
  a. A SL UE can perform UWB positioning measurements and computation of the location/range estimate with or without network assistance. Depending on the implementation this can refer to absolute/relative ranging metrics.

The location server or base station equipped with a Location Measurement Unit ("LMU") may signal the positioning modes using LPP/RRC/MAC CE signaling. In another implementation, if the target-UE is the source of the location information trigger, the UE may indicate the employed or desired positioning mode via LPP/RRC to the location server or base station equipped with an LMU. It should be noted that the proposed UWB RAT-independent positioning method may be used in at least one or more combinations of either, RAT-dependent positioning methods as listed in Table 3 and Table 4, or other RAT-independent positioning methods listed above, to improve the overall location and tracking accuracy of the target-UE as part of a hybrid positioning method. This hybrid positioning method may be triggered at the target-UE or location server and corresponding information regarding the employed positioning methods may be signaled to the corresponding node, e.g., location server, base station, or target-UE. This can be applicable to positioning methods along the Uu and SL interface.

The UWB ranging and localization components normally comprises of an anchor (fixed unit with a known location), tags (devices to be localized, may be stationary or mobile) and a location engine and/or server, which may be co-located or be based in the cloud. In addition, positioning may occur between two entities (tags or UEs) in a peer-to-peer fashion, without assistance from an anchor/access point/gNB. Table 5 indicates the exemplary supported positioning methods that enable ranging between a UWB transmitter ("TX") and receiver ("RX"). These type of positioning techniques can be signaled to the location server, e.g., LMF in addition to the computed UE's location using UWB or a hybrid positioning technique involving UWB localization.

TABLE 1

UWB Positioning Method

| Positioning Methods Types | Overview |
|---|---|
| Two Way Ranging (TWR) | Determines the Time of Flight (ToF) of the UWB RF signal from the tag to the anchor and then back to the tag (also vice versa can be initiated by anchor). It then computes the tag-anchor range by multiplying the time by the speed of light. Requires exchanges of 3 messages. Includes two variants including single-sided and double-sided TWR. |
| Phase Difference of Arrival (PDoA) | Computes the delta between phases of the received carrier using multiple antennas at the receiver. The relative orientation and position of the target device is computed in combination with the TWR method. |
| Time Difference of Arrival | The difference in time between the signal's arrival at multiple reference nodes or vice versa. The time differences are mapped to multiple intersected hyperbolas for the estimating the tag's location. Requires more than one anchor node to be involved in the positioning procedure. |

The positioning capabilities include support for absolute and relative positioning. The UE UWB measurements that may be exchanged with the network may broadly relate to supporting the following positioning techniques:
  a. Two-way ranging ("TWR")/Round Trip Time ("RTT") between a UWB anchor node and the UE, which is based on the Time-of-Flight ("ToF") of the ranging signal;
    i. These may include one-way ranging ("OWR"), single-sided TWR ("SS-TWR") or double-sided TWR ("DS-TWR") depending on the configured TWR technique.
  b. UWB Angle-of-Arrival/Phase difference of arrival measurements between a UWB anchor node(s) and the UE;
  c. TDOA measurements between multiple UWB anchor nodes and the UE; and
  d. UWB Received Signal Strength ("RSSI").

An anchor node may also refer to either a UWB access point, distributed gNB with UWB functionality or a UE. The above positioning methods may be applicable to the previously listed positioning modes. A combination of two or positioning techniques may also be applicable, e.g., TWR together with Phase difference of Arrival may be used to obtain a location estimate in 3D space.

The key measurements for UWB ranging are performed with respect to the transmitted and response frame. For example, the transmitted may include control message frame or data frame while the response frame may include an ACK/NACK frame or a measurement report frame. The aforementioned mentioned measurement report frame is referred to as the RFRAME.

Therefore, a crucial aspect to enhance the NR RAT-independent positioning framework is the accurate time stamps with respect to the transmitted and response frame. This will enable accurate ToA/ToF determination. Therefore, the TX and RX each capture timestamp report which can be shared within the NR positioning framework to entities such as the LMF or UE.

In one embodiment related to UWB exchange between 3GPP entities, the UE and LMF may exchange assistance data information related to UWB positioning depending on the capabilities at each of these entities. This is applicable for both UE-based and UE-assisted positioning. Exemplary assistance data that may be transferred from LMF to UE may include information related to the anchor nodes/beacons as seen in Table 6.

TABLE 2

Assistance Data from LMF to target-UE
Assistance Data

UWB Anchor Node/Beacon List
including channel assignments
Anchor Node IDs
Anchor Node USS ID
Anchor Node/Beacon Location
Information The location server, e.g., LMF can provide a UWB Anchor/Beacon list, which consists of all available anchor nodes in the vicinity of the target-UE to be localized including any associated identifiers differentiating the anchor nodes and corresponding channel frequency assignments. In addition, the UWB Secure Service ("USS") ID can also be shared (if available) with the target-UE since it provides secure routing feature for higher layers. In order to enable the timing-based localization methods, the location information of anchor nodes/beacons can also be provided to the target-UE.

The information provided to the LMF for UWB RAT-independent target-UE positioning can be further divided into three cases based on the operating positioning mode employed by the target-UE with UWB capabilities: 1) UE-assisted, 2) UE-Based, and 3) Standalone positioning. Table 7 is a breakdown of the information that may be signaled to the LMF from the target-UE via LPP/positioning-based protocol based on the supported aforementioned positioning modes and a required to UWB positioning as per the secure ranging standard. An alternate implementation may include support for SL-based positioning modes for UWB RAT-independent positioning, which can be further divided into SL UE-assisted and SL UE-based positioning modes as noted in Table 7.

TABLE 7

UWB measurement/location information signaled from target-UE to LMF

| Information | UE-Assisted | UE-Based | Stand-alone | SL UE-Assisted | SL UE-Based |
|---|---|---|---|---|---|
| UWB Location Information/Measurements | | | | | |
| Timestamp | Yes | No | No | Yes | No |
| Security Level | Yes | No | No | Yes | No |
| Key Source | Yes | No | No | Yes | No |
| Key ID Mode | Yes | No | No | Yes | No |
| Key Index | Yes | No | No | Yes | No |
| Ranging CounterStart | Yes | No | No | Yes | No |
| Ranging CounterStop | Yes | No | No | Yes | No |
| Ranging Tracking Interval | Yes | No | No | Yes | No |
| Ranging Offset | Yes | No | No | Yes | No |
| Ranging From | Yes | No | No | Yes | No |
| Angle-of-Arrival Azimuth | Yes | No | No | Yes | No |
| Angle-of-Arrival Elevation | Yes | No | No | Yes | No |
| Angle-of- Arrival Supported | Yes | No | No | Yes | No |
| RSSI (Received Signal Strength Indicator) | Yes | No | No | Yes | No |
| Target-UE Location Information | | | | | |
| Absolute target-UE position estimate with uncertainty shape using UWB positioning | No | Yes | Yes | No | Yes |
| Relative target-UE position estimate with uncertainty shape using UWB positioning | No | Yes | Yes | No | Yes |
| Position Time Stamp using UWB positioning | No | Yes | Yes | No | Yes |
| Location Source (UWB positioning method(s) used to compute location) | No | Yes | Yes | No | Yes |
| Absolute target-UE velocity estimate with uncertainty using UWB positioning | No | Yes | Yes | No | Yes |
| Relative target-UE velocity estimate with uncertainty using UWB positioning | No | Yes | Yes | No | Yes |

In Table 7, the following are defined:

Timestamp: Refers to the time in symbol periods corresponding to the reception start of the UWB data frame.

Security Level refers to the configured security mode used when receiving the UWB data frame.

Key ID Mode is used to identify the security key used by the source node (source-UE or anchor node).

Key Source identifies the source node and is deemed null if the Key ID to Mode is not present.

Key Index: is an index of the key used by the source node.

Ranging CounterStart: A timer that is initiated corresponding to an RMARKER (part of the frame that is time-stamped at the UWB antenna, e.g. the start symbol of the PHY header) indicating the start of a ranging positioning message exchange.

Ranging CounterStop: A timer that terminates corresponding to an RMARKER the end of a ranging positioning message exchange. In the case, of one-way ranging the time of arrival of the RMARKER is reported.

Ranging Tracking Interval: A timer initiated over a period in which the tracking offset was measured.

Ranging Offset: A timing advance or slip over the course of the entire ranging tracking interval.

Ranging Figure-of-Merit (FoM): A figure-of-merit/QoS of the ranging measurement indicating the quality of the measurements by considering the amount of available anchor nodes/source-UEs geometry of transmitters and uncertainty of the one way range measurements. The uncertainty may also be indicated as a constant value or function.

Angle-of-Arrival (AoA) Azimuth: Angle-of-arrival in the azimuth of the received signal measured in radians Angle-of-Arrival (AoA) Elevation: Angle-of-arrival in elevation of the received signal measured in radians Angle-of-Arrival Supported: Indicates the validity of the AoA Azimuth and Elevation measurements RSSI: Refers to the measured RF power level at the input of the transceiver during the reception of the synchronization header and is valid after the detection of the start-of-frame delimiter (SFD).

It can also be noted that the above parameters can be measured with respect to STS-ranging (scrambled time sequence) ranging and can be also signaled to the location server, if supported (enhanced ranging device ("ERDEV") or simply ranging device ("RDEV"). In an alternative implementation, the parameters in Table 7 may be signaled to a serving base station equipped with an LMU (location management functionality) using RRC/MAC CE signaling.

In the case of UE-Based/Standalone RAT-independent UWB positioning, the location information comprising of the position estimate/velocity estimates may also be transmitted to the location server.

In one embodiment related to NR positioning Procedures enabling UWB positioning, the required procedures for enabling RAT-independent positioning using UWB measurements and can be summarized with the following 4 key signaling procedures:

UWB Request and Provide Assistance Data
  a. UWB Assistance Data Elements
UWB Request and Location Information
  a. UWB Location Information Elements
UWB Request and Provide Capabilities
UWB Positioning Uncertainty and Error These messages can be signaled via LPP signaling in coordination with the location server. In an alternate implementation where the gNB has location computation and processing capabilities, the aforementioned procedures may be signaled using RRC/MAC CE signaling.

Figure 5A:
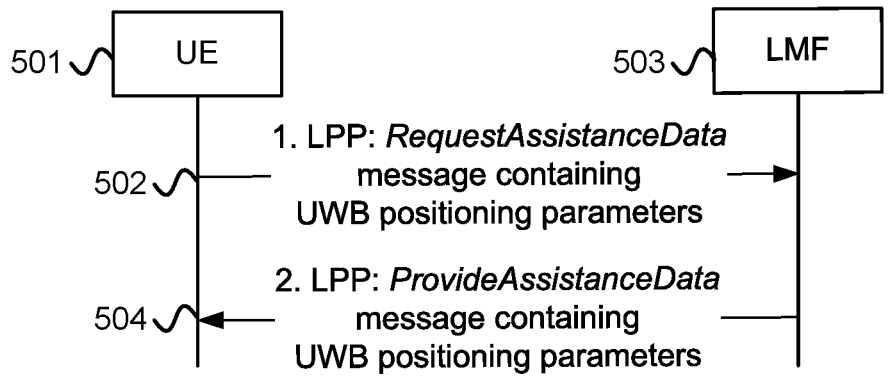
FIG. 5A is a diagram illustrating one embodiment of Request and Provide UWB Assistance Data procedures.

Regarding UWB Request and Provide Assistance Data, in FIG. 5A, the signaling message UWB-RequestAssistance-Data is used by the target device (e.g., UE 501) to request (see messaging 502) UWB assistance data from a location server such as the LMF 503, while the exemplary message, UWB-ProvideAssistanceData, may be used by the location server 503 to provide (see messaging 504) UWB assistance data to enable UE-based or UE-assisted UWB positioning.

This would be referred to as UE-initiated UWB assistance data transfer, while in the case of LMF-initiated UWB assistance data transfer, only Step 1 of FIG. 5A would be applicable. The UE 501 may determine the type of UWB assistance data it may require and indicate this via the exemplary UWB-RequestAssistanceData message. It may also be used to provide specific error messages in the case of any misconfiguration related to the UWB positioning system.

The assistance data may be transferred to the UE 501 in a single message, while alternate implementations may allow the assistance data message to be segmented into several messages. This may occur if the message size exceeds the allowable limit for transfer in a single message.

In an alternate implementation, the UWB assistance data may be further broadcasted to target-UEs as part of positioning system information blocks (posSIBs) upon request (on-demand posSIB request) or triggered by the LMF 503 and gNB.

In addition, Step 2 of FIG. 5A, can also contain the supported channel frequency assignments where a particular UWB positioning method is supported depending on if HRP-UWB or LRP-UWB is configured. Table 8 shows an exemplary list of the different UWB channel assignments, which can be signaled to the UE:

TABLE 3

UWB Channel Assignments

| Band Group | Channel Number | Centre Frequency (MHz) | Bandwidth (MHz) (−3 dB) | Mandatory/Optional |
|---|---|---|---|---|
| 0 | 0 | 499.2 | 499.2 | Mandatory (below 1 GHz) |
| 1 | 1 | 3494.4 | 499.2 | Optional |
|  | 2 | 3993.6 | 499.2 | Optional |
|  | 3 | 4492.8 | 499.2 | Mandatory |
|  | 4 | 3993.6 | 1331.2 | Optional |
| 2 | 5 | 6489.6 | 499.2 | Optional |
|  | 6 | 6988.8 | 499.2 | Optional |
|  | 7 | 6489.6 | 1081.6 | Optional |
|  | 8 | 7488.0 | 499.2 | Optional |
|  | 9 | 7987.2 | 499.2 | Mandatory |
|  | 10 | 8486.4 | 499.2 | Optional |
|  | 11 | 7987.2 | 1331.2 | Optional |
|  | 12 | 8985.6 | 499.2 | Optional |
|  | 13 | 9484.8 | 499.2 | Optional |
|  | 14 | 9984.0 | 499.2 | Optional |
|  | 15 | 9484.8 | 1354.97 | Optional |

Furthermore, the UWB assistance data may include location information of the various anchor nodes/beacons in a given geographic area in which the target-UE is to be absolutely or relatively localized. The location information may include latitude and longitude points and corresponding uncertainty points, e.g., as defined in TS 23.032.

Figure 5B:
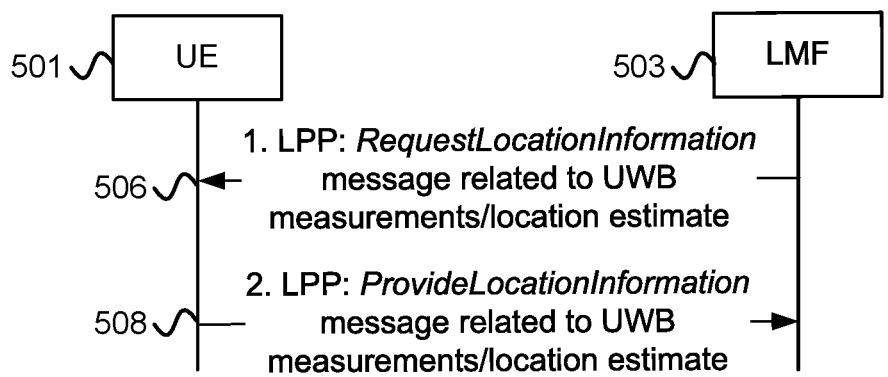
FIG. 5B is a diagram illustrating one embodiment of Request and Provide UWB Location information procedures.

In one embodiment regarding UWB Request and Provide Location Information, as shown in FIG. 5B, a message, e.g. UWB-RequestLocationInformation is used by the location server 503 to request (see messaging 506) MB measurements/location estimate from a target-UE 501 or a set of target-UEs, while an exemplary signaling message such as UWB-ProvideLocationInformation is used by the target device 501 to provide (see messaging 508) measurements or location information for one or more UWB anchor nodes with the associated UWB channels to the location server.

Such location information may comprise absolute and relative location data, latitude points, longitude points, horizontal and vertical velocity estimates, positioning and velocity uncertainty values, positioning error, heading information, 3D location estimates including elevation information, integrity of positioning estimates and quality of positioning estimate metrics. It may also provide some relative location measurements with respect to other target-UEs 501. Additionally, the utilized positioning methods may also be signaled to the LMF 503 together with the UWB measurements as indicated in Table 5. The target-UE 501 may also provide the necessary accuracy and integrity information to the LMF 503. It may also be used to provide error-specific messages in the case of any misconfiguration related to the UWB positioning system. The location server 503 may request the MB-related measurements from the target-UE 501 as denoted in Table 7.

Figure 5C:
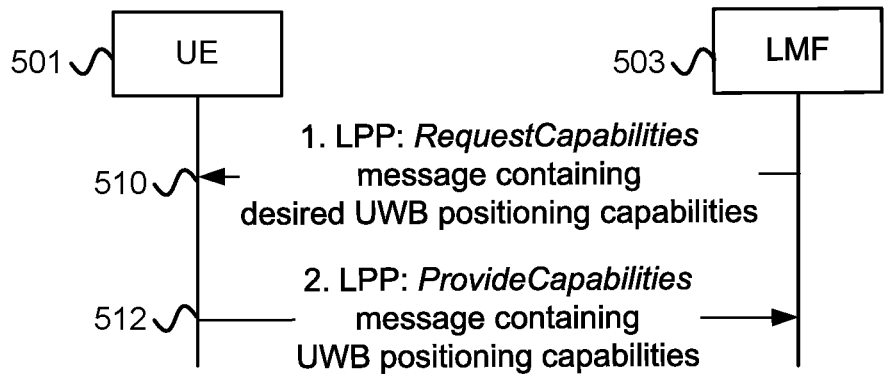
FIG. 5C is a diagram illustrating one embodiment of Request and Provide UWB Capability information procedures.

In one embodiment regarding UWB Request and Provide Capability Information, shown in FIG. 5C, a message, such as UWB-RequestCapabilities is used by the location server 503 to request (see messaging 510) MB positioning capabilities information from a target-UE 501, while an exemplary message such as UWB-ProvideCapabilites is used by the target-UE 501 to provide (see messaging 512) its UWB positioning capabilities to the location server 503.

Figure 5D:
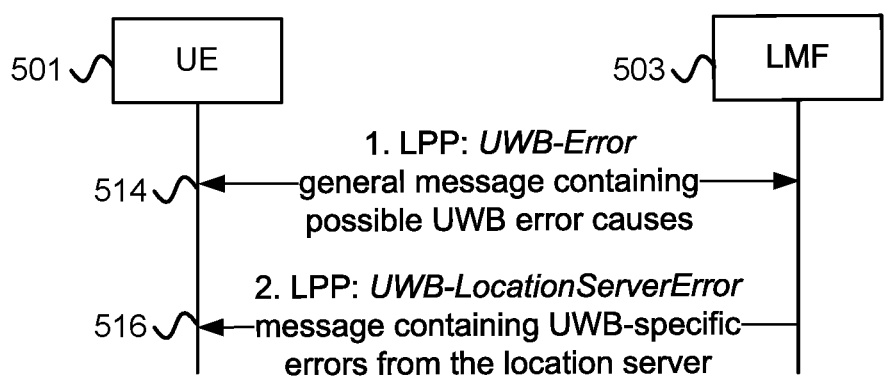
FIG. 5D is a diagram illustrating one embodiment of UWB Possible error exchange indication procedures.

In one embodiment regarding UWB Error Indications, shown in FIG. 5D, in the event of any misconfigurations, lack of any UWB assistance information, uncertainties in the ranging position estimate, and/or the like, an exemplary message such as a general UWB-Error message is used by the location server 503 or target device 501 to provide (see messaging 514) an indication of such error causes to the corresponding node. The type of error in addition to the originating node (target-UE 501 or location server 503) causing the error may also be indicated the via this message. In addition, the integrity of the UWB positioning estimate may also be signaled via a separate message (see messaging 516) in alternate implementations.

Here, in one embodiment, the potential error causes are from the location server side 503 (UWB configuration) or from the UE-side 501 (internal error related to any UWB measurement processing or the positioning estimate provided from the UE).

For the misconfiguration from location server 503 side, examples could be the unavailability of a UWB configuration, availability of a partial configuration, or an expired configuration that could result in an UWB configuration error cause.

Uncertainty information can be determined by comparing the desired location uncertainty e.g., 5%, 2%, 1% location certainty with the current calculated location estimate and see if it meets the provided uncertainty requirements. Uncertainty described herein may be different from the positioning estimate error in the sense that the positioning estimate error is determined when there is an issue with the positioning algorithm internal to the UE 501, while uncertainty assumes that the position estimate has already been calculated within some confidence intervals.

Figure 6:
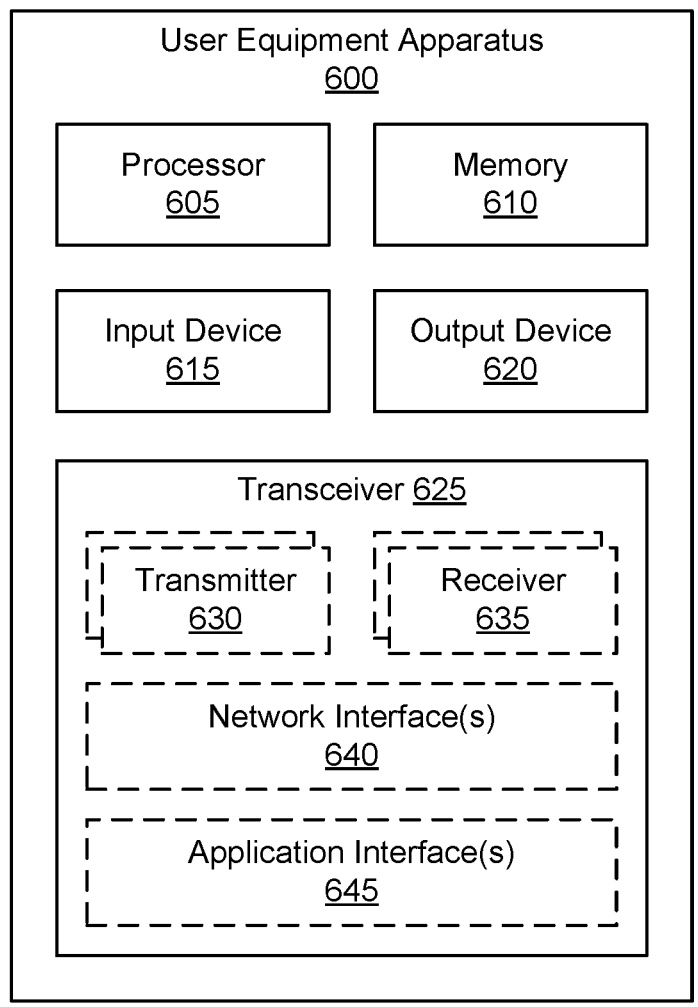
FIG. 6 is a block diagram illustrating one embodiment of a user equipment apparatus that may be used for ultra-wideband measurements for radio access technology-independent positioning.

FIG. 6 depicts a user equipment apparatus 600 that may be used for ultra-wideband measurements for radio access technology-independent positioning, according to embodiments of the disclosure. In various embodiments, the user equipment apparatus 600 is used to implement one or more of the solutions described above. The user equipment apparatus 600 may be one embodiment of the remote unit 105 and/or the UE 205, described above. Furthermore, the user equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. In some embodiments, the transceiver 625 communicates with one or more cells (or wireless coverage areas) supported by one or more base units 121. In various embodiments, the transceiver 625 is operable on unlicensed spectrum. Moreover, the transceiver 625 may include multiple UE panels supporting one or more beams. Additionally, the transceiver 625 may support at least one network interface 640 and/or application interface 645. The application interface(s) 645 may support one or more APIs. The network interface(s) 640 may support 3GPP reference points, such as Uu, N1, PC5, etc. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the user equipment apparatus 600 to implement the above described UE behaviors. In certain embodiments, the processor 605 may include an application processor (also known as "main processor") which manages application-domain and operating system ("OS") functions and a baseband processor (also known as "baseband radio processor") which manages radio functions.

In one embodiment, the transceiver 625 transmits, to a location server of a mobile wireless communication network, a set of capabilities related to ultra-wideband ("UWB") positioning for the UE device in response to a request from the location server for the set of capabilities, the set of capabilities used to determine at least one UWB positioning method for performing UWB positioning of the UE device.

In one embodiment, the transceiver 625 receives, from the location server, UWB assistance data to perform UWB positioning in response to a request for the assistance information, the assistance information comprising the at least one UWB positioning method for performing UWB positioning. In one embodiment, the transceiver 625 transmits, to the location server, a UWB measurement and location information report for the UE device using the at least one UWB positioning method associated with at least one of a set of timing-based and a set of angular-based UWB measurements in response to a request from the location server for the UWB measurement and location information.

In one embodiment, the processor 605 determines information for potential causes of error for one or more of a UWB configuration and a position estimate for the UE device. In one embodiment, the transceiver transmits, to the location server, the determined information for the potential causes of error. In one embodiment, the transceiver 625 receives, from the location server, UWB-specific error information associated with one or more of the UWB configuration and the position estimate information for correcting the determined potential causes of error.

In one embodiment, the location server is one or more of part of a core network and co-located with a base station of the mobile wireless communication network. In one embodiment, the transceiver 625 transmits the location information to the base station equipped with a location measurement unit ("LMU") using the at least one UWB positioning method in response to a request from the base station for the location information.

In one embodiment, the MB assistance data is received at the UE device in a dedicated manner using long-term evolution positioning protocol ("LPP") signaling in response to a request from the UE device. In one embodiment, the UWB assistance data is received at the UE device in a broadcast signal as part of positioning system information blocks ("posSIBs") triggered by one or more of the location server and a base station.

In one embodiment, the MB assistance data is received at the UE device in a broadcast signal as part of positioning system information blocks ("posSIBs") in response to an on-demand posSIB request by the UE device. In one embodiment, the UWB assistance information comprises UWB channel assignment information, anchor node identifiers, and anchor node location information.

In one embodiment, the transceiver 625 indicates a type of UWB positioning method utilized to compute the location information along with the transmission of the location information comprising at least one selected from the group of two-way ranging, phase difference of arrival, and time difference of arrival.

In one embodiment, the location information comprises at least one selected from the group of: absolute and relative location data, latitude points, longitude points, horizontal and vertical velocity estimates, positioning and velocity uncertainty values, positioning error, heading information, 3D location estimates, elevation information, integrity of positioning estimates, and quality of positioning estimate metrics.

In one embodiment, the transceiver 625 receives a positioning mode from the location service for UWB RAT-independent positioning, the positioning mode comprising at least one selected from the group of: standalone mode, UE-assisted mode, UE-based mode, and sidelink-based positioning mode.

In one embodiment, the transceiver 625 transmits ranging measurements according to the received positioning mode to the location server, the supported ranging measurements comprising at least one selected from the group of time-stamp, ranging counter, ranging offset, angle-of-arrival support indication, angle-of-arrival azimuth, angle-of-arrival elevation, received signal strength indicator.

In one embodiment, the processor 605 determines one or more of absolute and relative positioning and velocity estimates for the UE device based on the UWB positioning method. In one embodiment, the processor 605 enhances location and tracking accuracy of the UE device by combining the UWB positioning method at least one or more combinations of RAT-dependent positioning methods and other RAT-independent positioning methods.

In one embodiment, the transceiver 625 transmits an error type indication depending on if the error cause originates at the UE or location server. In one embodiment, the processor 605 utilizes a Uu interface between the UE device and a base station and a sidelink interface between the UE device and a peer UE device for transmitting and receiving information related to the UWB positioning method.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to ultra-wideband measurements for radio access technology-independent positioning. For example, the memory 610 may store various parameters, panel/beam configurations, resource assignments, policies, and the like as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all, or portions of the output device 620 may be integrated with the input device 615. For example, the input device 615 and output device 620 may form a touchscreen or similar touch-sensitive display. In other embodiments, the output device 620 may be located near the input device 615.

The transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 includes at least transmitter 630 and at least one receiver 635. One or more transmitters 630 may be used to provide UL communication signals to a base unit 121, such as the UL transmissions described herein. Similarly, one or more receivers 635 may be used to receive DL communication signals from the base unit 121, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
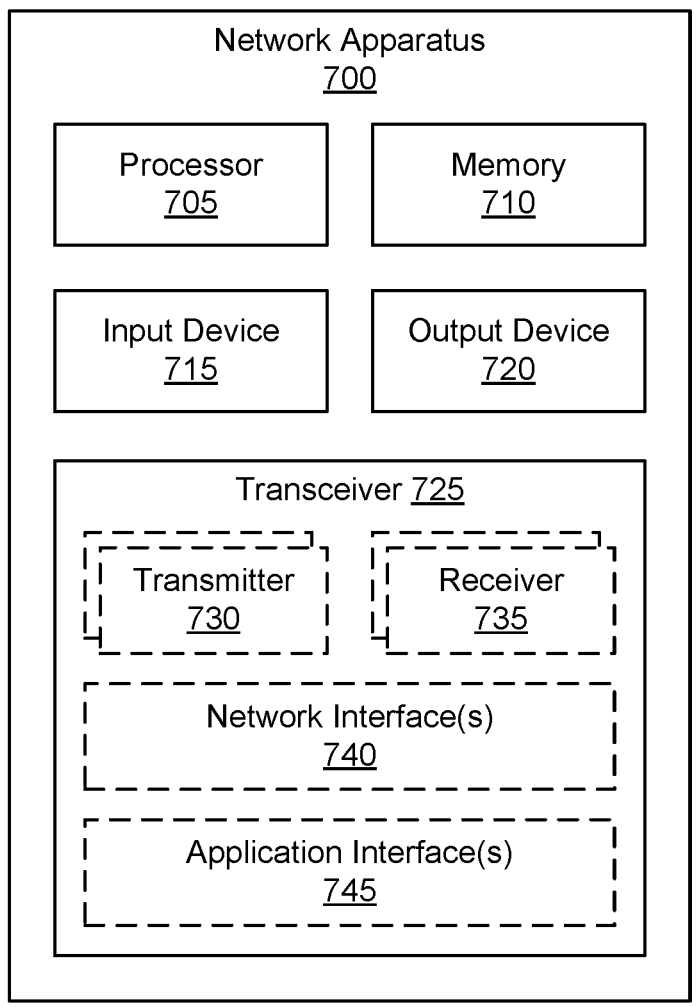
FIG. 7 is a block diagram illustrating one embodiment of a network equipment apparatus that may be used for ultra-wideband measurements for radio access technology-independent positioning.

FIG. 7 depicts a network apparatus 700 that may be used for ultra-wideband measurements for radio access technology-independent positioning, according to embodiments of the disclosure. In one embodiment, network apparatus 700 may be one implementation of a RAN node, such as the base unit 121 and/or the RAN node 210, as described above. Furthermore, the base network apparatus 700 may include a processor 705, a memory 710, an input device 715, an output device 720, and a transceiver 725.

In some embodiments, the input device 715 and the output device 720 are combined into a single device, such as a touchscreen. In certain embodiments, the network apparatus 700 may not include any input device 715 and/or output device 720. In various embodiments, the network apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. Here, the transceiver 725 communicates with one or more remote units 175. Additionally, the transceiver 725 may support at least one network interface 740 and/or application interface 745. The application interface(s) 745 may support one or more APIs. The network interface(s) 740 may support 3GPP reference points, such as Uu, N1, N2 and N3. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, a FPGA, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the network apparatus 700 is a RAN node (e.g., gNB) that communicates with one or more UEs, as described herein. In such embodiments, the processor 705 controls the network apparatus 700 to perform the above described RAN behaviors. When operating as a RAN node, the processor 705 may include an application processor (also known as "main processor") which manages application-domain and operating system ("OS") functions and a baseband processor (also known as "baseband radio processor") which manages radio functions.

In various embodiments, the processor 705 and transceiver 725 control the network apparatus 700 to perform the above described LMF behaviors. In one embodiment, transceiver 725 receives, from a user equipment ("UE") device, a set of capabilities related to ultra-wideband ("UWB") positioning for the UE device in response to a request for the set of capabilities, the set of capabilities used to determine at least one UWB positioning method for performing UWB positioning of the UE device.

In one embodiment, the transceiver 725 transmits, to the user equipment ("UE") device, UWB assistance data to perform UWB positioning in response to a request for the assistance information, the assistance information comprising the at least one UWB positioning method for performing UWB positioning.

In one embodiment, the transceiver 725 receives, from the UE device, a UWB measurement and location information report for the UE device using the at least one UWB positioning method associated with at least one of a set of timing-based and a set of angular-based UWB measurements in response to a request from the location server for the UWB measurement and location information.

In one embodiment, the transceiver 725 receives, from the UE device, information describing potential causes of error for one or more of a UWB configuration and a position estimate for the UE device. In one embodiment, the transceiver 725 transmits, to the UE device, UWB-specific error information associated with one or more of the UWB configuration and the position estimate information for correcting the determined potential causes of error.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to ultra-wideband measurements for radio access technology-independent positioning. For example, the memory 710 may store parameters, configurations, resource assignments, policies, and the like, as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the network apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all, or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to communicate with the UE, as described herein. Similarly, one or more receivers 735 may be used to communicate with network functions in the PLMN and/or RAN, as described herein. Although only one transmitter 730 and one receiver 735 are illustrated, the network apparatus 700 may have any suitable number of transmitters 730 and receivers 735. Further, the transmitter(s) 730 and the receiver(s) 735 may be any suitable type of transmitters and receivers.

Figure 8:
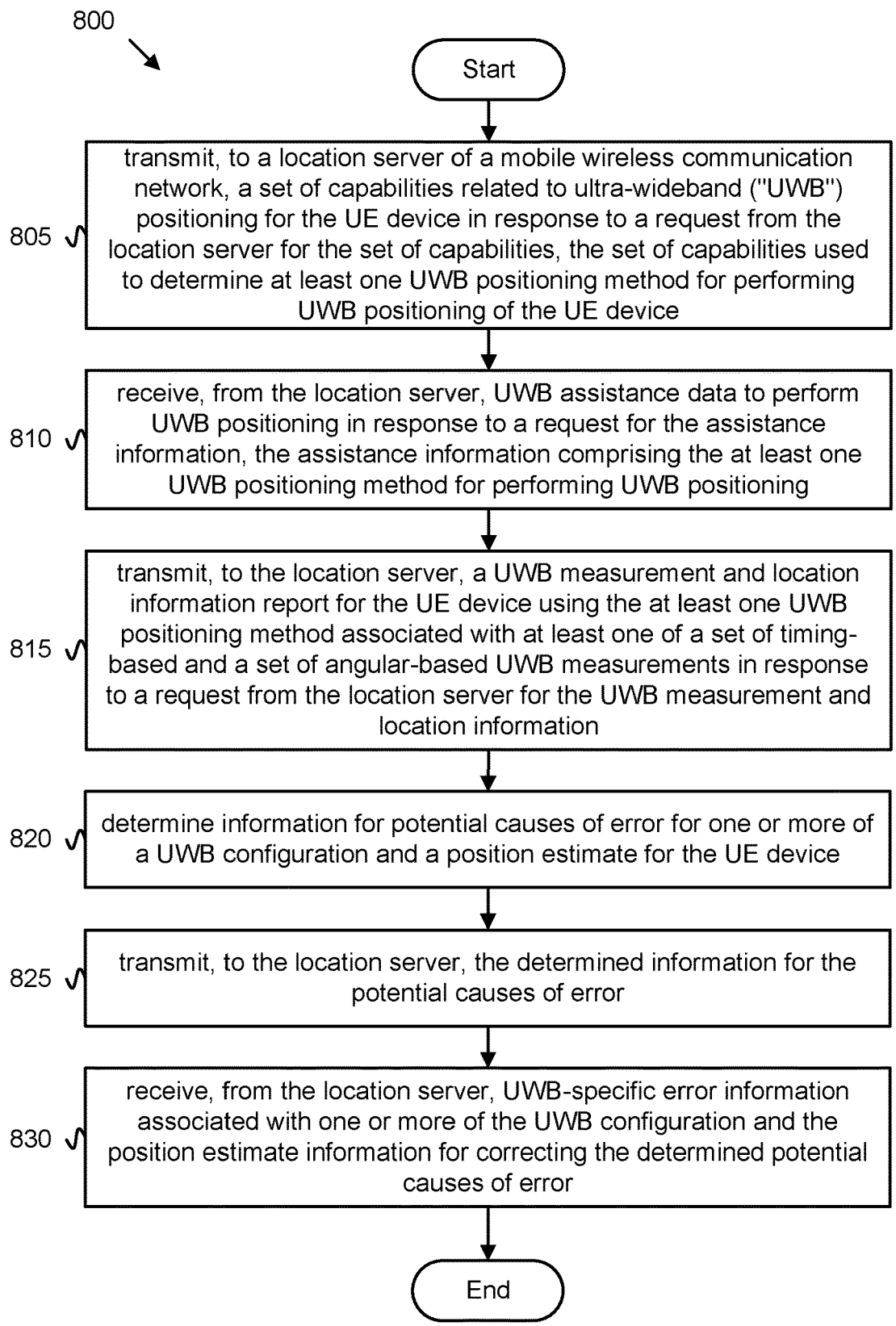
FIG. 8 is a block diagram illustrating one embodiment of a first method for ultra-wideband measurements for radio access technology-independent positioning.

FIG. 8 depicts one embodiment of a method 800 for ultra-wideband measurements for radio access technology-independent positioning, according to embodiments of the disclosure. In various embodiments, the method 800 is performed by a user equipment device in a mobile communication network, such as the remote unit 105, the UE 205, and/or the user equipment apparatus 600, described above. In some embodiments, the method 800 is performed by a processor, such as a microcontroller, a microprocessor, a CPU, a GPU, an auxiliary processing unit, a FPGA, or the like.

In one embodiment, the method 800 begins and transmits 805, to a location server of a mobile wireless communication network, a set of capabilities related to ultra-wideband ("UWB") positioning for the UE device in response to a request from the location server for the set of capabilities, the set of capabilities used to determine at least one UWB positioning method for performing UWB positioning of the UE device. The method 800 receives 810, from the location server, UWB assistance data to perform UWB positioning in response to a request for the assistance information, the assistance information comprising the at least one UWB positioning method for performing UWB positioning.

The method 800 transmits 815, to the location server, a UWB measurement and location information report for the UE device using the at least one UWB positioning method associated with at least one of a set of timing-based and a set of angular-based UWB measurements in response to a request from the location server for the UWB measurement and location information. The method 800 determines 820 information for potential causes of error for one or more of a UWB configuration and a position estimate for the UE device.

The method 800 transmits 825, to the location server, the determined information for the potential causes of error. The method 800 receives 830, from the location server, MB-specific error information associated with one or more of the UWB configuration and the position estimate information for correcting the determined potential causes of error, and the method 800 ends.

Figure 9:
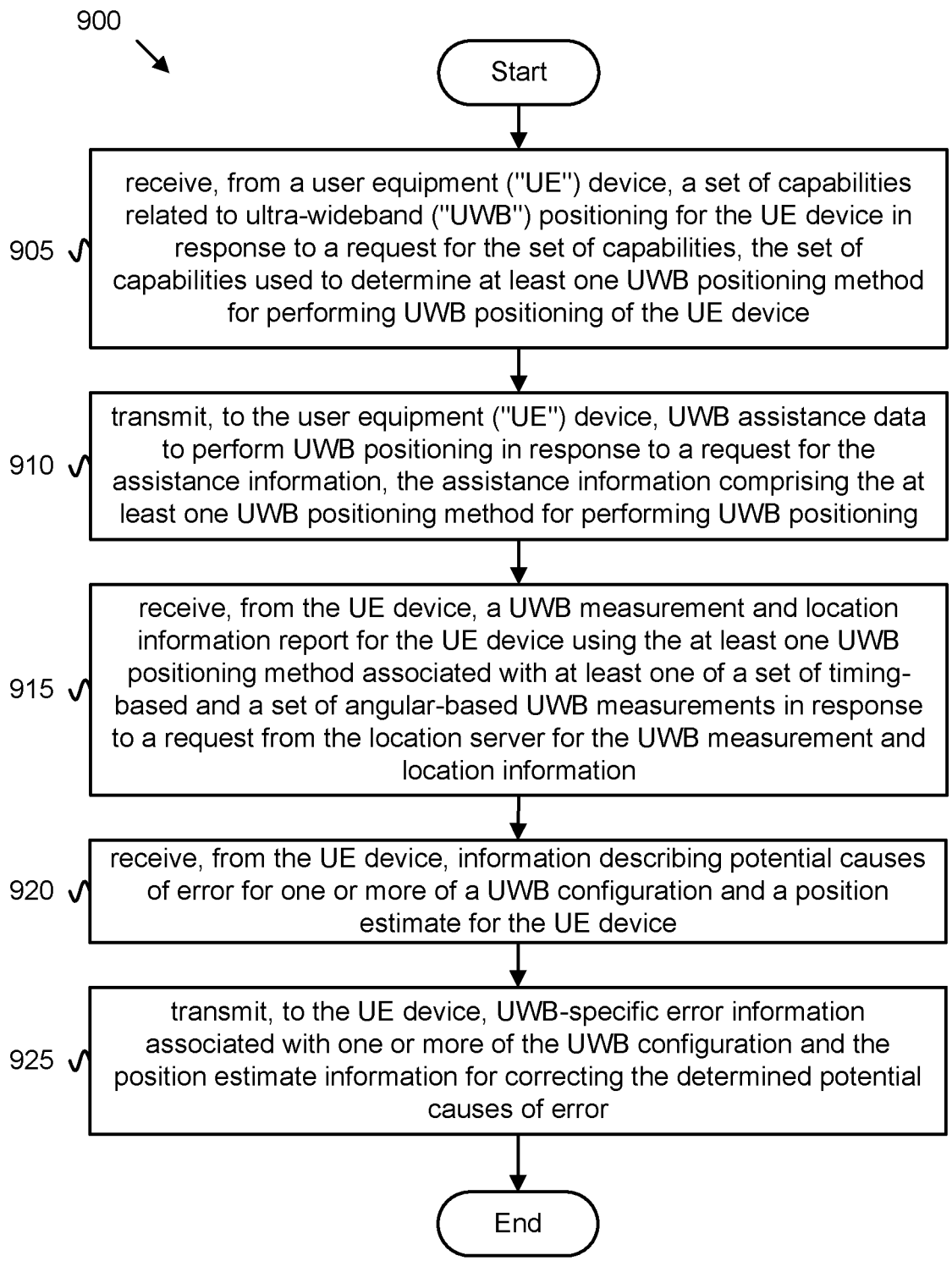
FIG. 9 is a block diagram illustrating one embodiment of a second method for ultra-wideband measurements for radio access technology-independent positioning.

FIG. 9 depicts one embodiment of a method 900 for ultra-wideband measurements for radio access technology-independent positioning, according to embodiments of the disclosure. In various embodiments, the method 900 is performed by a Location Management Function in a mobile communication network, such as the LMF 144, and/or the network apparatus 700, described above. In some embodiments, the method 900 is performed by a processor, such as a microcontroller, a microprocessor, a CPU, a GPU, an auxiliary processing unit, a FPGA, or the like.

The method 900 begins and receives 905, from a user equipment ("UE") device, a set of capabilities related to ultra-wideband ("UWB") positioning for the UE device in response to a request for the set of capabilities, the set of capabilities used to determine at least one UWB positioning method for performing UWB positioning of the UE device.

The method 900 transmits 910, to the user equipment ("UE") device, MB assistance data to perform UWB positioning in response to a request for the assistance information, the assistance information comprising the at least one UWB positioning method for performing UWB positioning.

The method 900 receives 915, from the UE device, a MB measurement and location information report for the UE device using the at least one UWB positioning method associated with at least one of a set of timing-based and a set of angular-based UWB measurements in response to a request from the location server for the UWB measurement and location information.

The method 900 receives 920, from the UE device, information describing potential causes of error for one or more of a UWB configuration and a position estimate for the UE device. The method 900 transmits 925, to the UE device, MB-specific error information associated with one or more of the UWB configuration and the position estimate information for correcting the determined potential causes of error, and the method 900 ends.

Disclosed herein is a first apparatus for ultra-wideband measurements for radio access technology-independent positioning, according to embodiments of the disclosure. The first apparatus may be implemented by a user equipment device in a mobile communication network, such as the remote unit 105, the UE 205, and/or the user equipment apparatus 600, described above.

In one embodiment, the first apparatus includes a transceiver that transmits, to a location server of a mobile wireless communication network, a set of capabilities related to ultra-wideband ("UWB") positioning for the UE device in response to a request from the location server for the set of capabilities, the set of capabilities used to determine at least one MB positioning method for performing UWB positioning of the UE device.

In one embodiment, the transceiver receives, from the location server, MB assistance data to perform UWB positioning in response to a request for the assistance information, the assistance information comprising the at least one UWB positioning method for performing UWB positioning. In one embodiment, the transceiver transmits, to the location server, a UWB measurement and location information report for the UE device using the at least one UWB positioning method associated with at least one of a set of timing-based and a set of angular-based UWB measurements in response to a request from the location server for the UWB measurement and location information.

In one embodiment, the first apparatus includes a processor that determines information for potential causes of error for one or more of a UWB configuration and a position estimate for the UE device. In one embodiment, the transceiver transmits, to the location server, the determined information for the potential causes of error. In one embodiment, the transceiver receives, from the location server, MB-specific error information associated with one or more of the UWB configuration and the position estimate information for correcting the determined potential causes of error.

In one embodiment, the location server is one or more of part of a core network and co-located with a base station of the mobile wireless communication network. In one embodiment, the transceiver transmits the location information to the base station equipped with a location measurement unit ("LMU") using the at least one UWB positioning method in response to a request from the base station for the location information.

In one embodiment, the UWB assistance data is received at the UE device in a dedicated manner using long-term evolution positioning protocol ("LPP") signaling in response to a request from the UE device. In one embodiment, the UWB assistance data is received at the UE device in a broadcast signal as part of positioning system information blocks ("posSIBs") triggered by one or more of the location server and a base station.

In one embodiment, the UWB assistance data is received at the UE device in a broadcast signal as part of positioning system information blocks ("posSIBs") in response to an on-demand posSIB request by the UE device. In one embodiment, the UWB assistance information comprises UWB channel assignment information, anchor node identifiers, and anchor node location information.

In one embodiment, the transceiver indicates a type of UWB positioning method utilized to compute the location information along with the transmission of the location information comprising at least one selected from the group of two-way ranging, phase difference of arrival, and time difference of arrival.

In one embodiment, the location information comprises at least one selected from the group of: absolute and relative location data, latitude points, longitude points, horizontal and vertical velocity estimates, positioning and velocity uncertainty values, positioning error, heading information, 3D location estimates, elevation information, integrity of positioning estimates, and quality of positioning estimate metrics.

In one embodiment, the transceiver receives a positioning mode from the location service for UWB RAT-independent positioning, the positioning mode comprising at least one selected from the group of: standalone mode, UE-assisted mode, UE-based mode, and sidelink-based positioning mode.

In one embodiment, the transceiver transmits ranging measurements according to the received positioning mode to the location server, the supported ranging measurements comprising at least one selected from the group of timestamp, ranging counter, ranging offset, angle-of-arrival support indication, angle-of-arrival azimuth, angle-of-arrival elevation, received signal strength indicator.

In one embodiment, the processor determines one or more of absolute and relative positioning and velocity estimates for the UE device based on the UWB positioning method. In one embodiment, the processor enhances location and tracking accuracy of the UE device by combining the UWB positioning method at least one or more combinations of RAT-dependent positioning methods and other RAT-independent positioning methods.

In one embodiment, the transceiver transmits an error type indication depending on if the error cause originates at the UE or location server. In one embodiment, the processor utilizes a Uu interface between the UE device and a base station and a sidelink interface between the UE device and a peer UE device for transmitting and receiving information related to the UWB positioning method.

Disclosed herein is a first method for ultra-wideband measurements for radio access technology-independent positioning, according to embodiments of the disclosure. The first method may be performed by a user equipment device in a mobile communication network, such as the remote unit 105, the UE 205, and/or the user equipment apparatus 600, described above.

In one embodiment, the first method includes transmitting, to a location server of a mobile wireless communication network, a set of capabilities related to ultra-wideband ("UWB") positioning for the UE device in response to a request from the location server for the set of capabilities, the set of capabilities used to determine at least one UWB positioning method for performing UWB positioning of the UE device.

In one embodiment, the first method includes receiving, from the location server, UWB assistance data to perform UWB positioning in response to a request for the assistance information, the assistance information comprising the at least one UWB positioning method for performing UWB positioning. In one embodiment, the first method includes transmitting, to the location server, a UWB measurement and location information report for the UE device using the at least one UWB positioning method associated with at least one of a set of timing-based and a set of angular-based UWB measurements in response to a request from the location server for the UWB measurement and location information.

In one embodiment, the first method includes determining information for potential causes of error for one or more of a UWB configuration and a position estimate for the UE device. In one embodiment, the transceiver transmits, to the location server, the determined information for the potential causes of error. In one embodiment, the first method includes receiving, from the location server, UWB-specific error information associated with one or more of the UWB configuration and the position estimate information for correcting the determined potential causes of error.

In one embodiment, the location server is one or more of part of a core network and co-located with a base station of the mobile wireless communication network. In one embodiment, the first method includes transmitting the location information to the base station equipped with a location measurement unit ("LMU") using the at least one UWB positioning method in response to a request from the base station for the location information.

In one embodiment, the UWB assistance data is received at the UE device in a dedicated manner using long-term evolution positioning protocol ("LPP") signaling in response to a request from the UE device. In one embodiment, the UWB assistance data is received at the UE device in a broadcast signal as part of positioning system information blocks ("posSIBs") triggered by one or more of the location server and a base station.

In one embodiment, the UWB assistance data is received at the UE device in a broadcast signal as part of positioning system information blocks ("posSIBs") in response to an on-demand posSIB request by the UE device. In one embodiment, the UWB assistance information comprises UWB channel assignment information, anchor node identifiers, and anchor node location information.

In one embodiment, the first method includes indicating a type of UWB positioning method utilized to compute the location information along with the transmission of the location information comprising at least one selected from the group of two-way ranging, phase difference of arrival, and time difference of arrival.

In one embodiment, the location information comprises at least one selected from the group of: absolute and relative location data, latitude points, longitude points, horizontal and vertical velocity estimates, positioning and velocity uncertainty values, positioning error, heading information, 3D location estimates, elevation information, integrity of positioning estimates, and quality of positioning estimate metrics.

In one embodiment, the first method includes receiving a positioning mode from the location service for UWB RAT-independent positioning, the positioning mode comprising at least one selected from the group of: standalone mode, UE-assisted mode, UE-based mode, and sidelink-based positioning mode.

In one embodiment, the first method includes transmitting ranging measurements according to the received positioning mode to the location server, the supported ranging measurements comprising at least one selected from the group of timestamp, ranging counter, ranging offset, angle-of-arrival support indication, angle-of-arrival azimuth, angle-of-arrival elevation, received signal strength indicator.

In one embodiment, the first method includes determining one or more of absolute and relative positioning and velocity estimates for the UE device based on the UWB positioning method. In one embodiment, the first method includes enhancing location and tracking accuracy of the UE device by combining the UWB positioning method at least one or more combinations of RAT-dependent positioning methods and other RAT-independent positioning methods.

In one embodiment, the first method includes transmitting an error type indication depending on if the error cause originates at the UE or location server. In one embodiment, the first method includes utilizing a Uu interface between the UE device and a base station and a sidelink interface between the UE device and a peer UE device for transmitting and receiving information related to the UWB positioning method.

Disclosed herein is a second apparatus for ultra-wideband measurements for radio access technology-independent positioning, according to embodiments of the disclosure. The second apparatus may be implemented by a base station, e.g., a gNB, a location management function in a mobile communication network, such as the LMF 144, and/or the network apparatus 700, described above.

In one embodiment, the second apparatus includes a transceiver that receives, from a user equipment ("UE") device, a set of capabilities related to ultra-wideband ("MB") positioning for the UE device in response to a request for the set of capabilities, the set of capabilities used to determine at least one UWB positioning method for performing UWB positioning of the UE device.

In one embodiment, the transceiver transmits, to the user equipment ("UE") device, UWB assistance data to perform UWB positioning in response to a request for the assistance information, the assistance information comprising the at least one UWB positioning method for performing UWB positioning.

In one embodiment, the transceiver receives, from the UE device, a MB measurement and location information report for the UE device using the at least one UWB positioning method associated with at least one of a set of timing-based and a set of angular-based UWB measurements in response to a request from the location server for the MB measurement and location information.

In one embodiment, the transceiver receives, from the UE device, information describing potential causes of error for one or more of a UWB configuration and a position estimate for the UE device. In one embodiment, the transceiver transmits, to the UE device, MB-specific error information associated with one or more of the UWB configuration and the position estimate information for correcting the determined potential causes of error.

Disclosed herein is a second method for ultra-wideband measurements for radio access technology-independent positioning, according to embodiments of the disclosure. The second method may be performed by a base station, e.g., a gNB, a location management function device in a mobile communication network, such as the LMF 144, and/or the network apparatus 700, described above.

In one embodiment, the second method includes receiving, from a user equipment ("UE") device, a set of capabilities related to ultra-wideband ("UWB") positioning for the UE device in response to a request for the set of capabilities, the set of capabilities used to determine at least one UWB positioning method for performing UWB positioning of the UE device.

In one embodiment, the second method includes transmitting, to the user equipment ("UE") device, UWB assistance data to perform UWB positioning in response to a request for the assistance information, the assistance information comprising the at least one UWB positioning method for performing UWB positioning.

In one embodiment, the second method includes receiving, from the UE device, a UWB measurement and location information report for the UE device using the at least one UWB positioning method associated with at least one of a set of timing-based and a set of angular-based UWB measurements in response to a request from the location server for the MB measurement and location information.

In one embodiment, the second method includes receiving, from the UE device, information describing potential causes of error for one or more of a UWB configuration and a position estimate for the UE device. In one embodiment, the second method includes transmitting, to the UE device, UWB-specific error information associated with one or more of the UWB configuration and the position estimate information for correcting the determined potential causes of error.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:
at least one memory; and
at least one processor coupled with the at least one memory and configured to cause the UE to:
transmit a set of capabilities related to ultra-wideband ("UWB") positioning for the UE, the set of capabilities used to determine at least one UWB positioning method for performing UWB positioning of the UE device;
receive UWB assistance data to perform UWB positioning, the UWB assistance data comprising the at least one UWB positioning method for performing UWB positioning;
transmit a UWB measurement and location information report for the UE using the at least one UWB positioning method associated with at least one of a set of timing-based and a set of angular-based UWB measurements;
determine information for potential causes of error for one or more of a UWB configuration and a position estimate for the UE;
transmit the determined information for the potential causes of error; and
receive UWB-specific error information associated with one or more of the UWB configuration and the position estimate information for correcting the potential causes of error.

2. The UE of claim 1, wherein the at least one processor is configured to cause the UE to receive the UWB assistance data in a dedicated manner using long-term evolution positioning protocol ("LPP") signaling.

3. The UE of claim 1, wherein the at least one processor is configured to cause the UE to receive the UWB assistance data in a broadcast signal as part of positioning system information blocks ("posSIBs") triggered by one or more of a location server and a base station.

4. The UE of claim 3, wherein the at least one processor is configured to cause the UE to receive the UWB assistance data in a broadcast signal as part of positioning system information blocks ("posSIBs") in response to an on-demand posSIB request.

5. The UE of claim 1, wherein the UWB assistance data comprises UWB channel assignment information, anchor node identifiers, anchor node location information, or a combination thereof.

6. The UE of claim 1, wherein the at least one processor is configured to cause the UE to indicate a type of UWB positioning method utilized to compute location information, wherein transmission of the location information comprises two-way ranging, phase difference of arrival, time difference of arrival, or a combination thereof.

7. The UE of claim 1, wherein the location information comprises absolute and relative location data, latitude points, longitude points, horizontal and vertical velocity estimates, positioning and velocity uncertainty values, positioning error, heading information, 3D location estimates, elevation information, integrity of positioning estimates, quality of positioning estimate metrics, or a combination thereof.

8. The UE of claim 1, wherein the at least one processor is configured to cause the UE to receive a positioning mode for UWB radio access technology ("RAT")-independent positioning, the positioning mode comprising a standalone mode, UE-assisted mode, UE-based mode, sidelink-based positioning mode, or a combination thereof.

9. The UE of claim 8, wherein the at least one processor is configured to cause the UE to transmit ranging measurements according to the positioning mode, wherein supported ranging measurements comprise a timestamp, ranging counter, ranging offset, angle-of-arrival support indication, angle-of-arrival azimuth, angle-of-arrival elevation, received signal strength indicator, or a combination thereof.

10. The UE of claim 1, wherein the at least one processor is configured to cause the UE to determine absolute positioning, relative positioning, velocity estimates, or a combination thereof for the UE based on the UWB positioning method.

11. The UE of claim 1, wherein the at least one processor is configured to cause the UE to enhance location and tracking accuracy of the UE by combining the UWB positioning method, at least one or more combinations of RAT-dependent positioning methods, and other RAT-independent positioning methods.

12. The UE of claim 1, wherein the at least one processor is configured to cause the UE to transmit an error type indication, the error type indication determined according to whether a cause of the error originates at the UE or a location server.

13. The UE of claim 1, wherein the at least one processor is configured to cause the UE to utilize a Uu interface between the UE and a base station, and a sidelink interface between the UE and a peer UE for transmitting and receiving information related to the UWB positioning method.

14. A method performed by a user equipment ("UE"), the method comprising:
transmitting a set of capabilities related to ultra-wideband ("UWB") positioning for the UE, the set of capabilities used to determine at least one UWB positioning method for performing UWB positioning of the UE;
receiving UWB assistance data to perform UWB positioning, the UWB assistance data comprising the at least one UWB positioning method for performing UWB positioning;
transmitting a UWB measurement and location information report for the UE using the at least one UWB positioning method associated with at least one of a set of timing-based and a set of angular-based UWB measurements;
determining information for potential causes of error for one or more of a UWB configuration and a position estimate for the UE;
transmitting the determined information for the potential causes of error; and
receiving UWB-specific error information associated with one or more of the UWB configuration and the position estimate information for correcting the potential causes of error.

15. A network equipment ("NE") for wireless communication, comprising:

at least one memory; and at least one processor coupled with the at least one memory and configured to cause the NE to:

receive a set of capabilities related to ultra-wideband ("UWB") positioning for a user equipment ("UE"), the set of capabilities used to determine at least one UWB positioning method for performing UWB positioning of the UE;

transmit UWB assistance data to perform UWB positioning, the UWB assistance data comprising the at least one UWB positioning method for performing UWB positioning;

receive a UWB measurement and location information report for the UE using the at least one UWB positioning method associated with at least one of a set of timing-based and a set of angular-based UWB measurements;

receive information describing potential causes of error for one or more of a UWB configuration and a position estimate for the UE; and transmit UWB-specific error information associated with one or more of the UWB configuration and the position estimate information for correcting the potential causes of error.

16. A processor for wireless communication, comprising:

at least one controller coupled with at least one memory and configured to cause the processor to:

transmit a set of capabilities related to ultra-wideband ("UWB") positioning for a user equipment ("UE"), the set of capabilities used to determine at least one UWB positioning method for performing UWB positioning of the UE;

receive UWB assistance data to perform UWB positioning, the UWB assistance data comprising the at least one UWB positioning method for performing UWB positioning;

transmit a UWB measurement and location information report for the UE using the at least one UWB positioning method associated with at least one of a set of timing-based and a set of angular-based UWB measurements;

determine information for potential causes of error for one or more of a UWB configuration and a position estimate for the UE;

transmit the determined information for the potential causes of error; and receive UWB-specific error information associated with one or more of the UWB configuration and the position estimate information for correcting the potential causes of error.

17. The processor of claim 16, wherein the at least one controller is configured to cause the processor to receive the UWB assistance data in a dedicated manner using long-term evolution positioning protocol ("LPP") signaling.

18. The processor of claim 16, wherein the at least one controller is configured to cause the processor to receive the UWB assistance data in a broadcast signal as part of positioning system information blocks ("posSIBs") triggered by one or more of a location server and a base station.

19. The processor of claim 18, wherein the at least one controller is configured to cause the processor to receive the UWB assistance data in a broadcast signal as part of positioning system information blocks ("posSIBs") in response to an on-demand posSIB request.

20. The processor of claim 16, wherein the UWB assistance data comprises UWB channel assignment information, anchor node identifiers, anchor node location information, or a combination thereof.

* * * * *